(12) United States Patent
Bond et al.

(10) Patent No.: US 12,163,587 B2
(45) Date of Patent: Dec. 10, 2024

(54) GASKET

(71) Applicant: Flexitallic Investments, Inc., Houston, TX (US)

(72) Inventors: Stephen Peter Bond, Houston, TX (US); Stuart John Shaw, Leeds (GB); Roberto Yumbla Orbes, Cleckheaton (GB); Michael Nash, Cleckheaton (GB); Yi Li, League City, TX (US)

(73) Assignee: Flexitallic Investments, Inc., Houston, TX (US)

( * ) Notice: Subject to any disclaimer, the term of this patent is extended or adjusted under 35 U.S.C. 154(b) by 0 days.

(21) Appl. No.: 17/272,284

(22) PCT Filed: Aug. 30, 2019

(86) PCT No.: PCT/GB2019/052432
§ 371 (c)(1),
(2) Date: Feb. 26, 2021

(87) PCT Pub. No.: WO2020/044058
PCT Pub. Date: Mar. 5, 2020

(65) Prior Publication Data
US 2021/0262569 A1    Aug. 26, 2021

(30) Foreign Application Priority Data
Aug. 30, 2018    (GB) .................... 1814134

(51) Int. Cl.
*F16J 15/06* (2006.01)
*F16J 15/10* (2006.01)
(Continued)

(52) U.S. Cl.
CPC ........ *F16J 15/064* (2013.01); *F16J 15/102* (2013.01); *F16J 15/121* (2013.01); *F16L 23/18* (2013.01)

(58) Field of Classification Search
CPC .. F16J 15/06; F16J 15/064; F16J 15/10; F16J 15/102; F16J 15/104; F16J 15/12; F16J 15/121; F16J 15/122; F16L 23/18
See application file for complete search history.

(56) References Cited

U.S. PATENT DOCUMENTS 2,269,486 A    1/1942    Santoro
3,717,351 A    2/1973    Liebig
(Continued)

FOREIGN PATENT DOCUMENTS

CN    201351730 Y    11/2009
CN    203743426 U    7/2014
(Continued)

OTHER PUBLICATIONS

Application No. PCT/US2021/023044, International Search Report and Written Opinion, Mailed On Jun. 23, 2021, 12 pages.
(Continued)

*Primary Examiner* — Gilbert Y Lee
(74) *Attorney, Agent, or Firm* — Kilpatrick Townsend & Stockton LLP

(57) ABSTRACT

There is provided a gasket comprising a rigid core (2) defining an aperture (4). The core has a serrated profile (8) on at least one of its upper and lower outer surfaces and the core is divided into upper and lower parts (2a, 2b) each having a respective outer surface (6a, 6b) and also an inner surface (42, 44) opposite the outer surface. The gasket also includes an optional sealing facing (12, 14) on the at least one outer serrated profile surface, wherein an inner insulating layer (40) is located between the said upper and lower parts so that it is operable to substantially reduce electrical conduction between the said upper and lower parts. There is described a method of production of the gasket and use of the gasket.

15 Claims, 15 Drawing Sheets

(51) Int. Cl.
*F16J 15/12* (2006.01)
*F16L 23/18* (2006.01)

(56) References Cited

U.S. PATENT DOCUMENTS

| | | | |
|---|---|---|---|
| 3,720,420 | A | 3/1973 | Jelinek et al. |
| 3,871,668 | A | 3/1975 | Coker et al. |
| 5,511,797 | A | 4/1996 | Nikirk et al. |
| 2005/0121859 | A1 | 6/2005 | Seidel et al. |
| 2006/0220324 | A1* | 10/2006 | Anderson ............ F16J 15/122 277/606 |
| 2011/0115170 | A1 | 5/2011 | Krejei |
| 2013/0249171 | A1 | 9/2013 | Kolb |
| 2013/0328270 | A1 | 12/2013 | Stubblefield et al. |
| 2015/0060352 | A1 | 3/2015 | Yoder et al. |
| 2016/0040783 | A1 | 2/2016 | Kullen |
| 2016/0138172 | A1 | 5/2016 | Al-buraiki |
| 2016/0138718 | A1* | 5/2016 | Lee ................ F16J 15/122 277/608 |
| 2017/0074437 | A1 | 3/2017 | Briggs |
| 2017/0152973 | A1 | 6/2017 | Kolb et al. |
| 2018/0328491 | A1 | 11/2018 | Taylor |
| 2019/0234516 | A1 | 8/2019 | Lee |
| 2021/0003218 | A1* | 1/2021 | Lee ................ F16J 15/122 |

FOREIGN PATENT DOCUMENTS

| | | |
|---|---|---|
| DE | 3643283 | 3/1988 |
| DE | 19755318 | 7/1999 |
| DE | 202005006698 U | 6/2005 |
| DE | 102014002941 A | 8/2014 |
| DE | 102015016155 A | 6/2017 |
| EP | 0640782 A | 3/1995 |
| EP | 1670872 B1 | 9/2012 |
| EP | 2607753 A1 | 6/2013 |
| EP | 3051083 A1 | 8/2016 |
| EP | 3593976 A1 | 1/2020 |
| FR | 2639416 A1 | 5/1990 |
| GB | 2278651 A | 12/1994 |
| GB | 2546958 A | 8/2017 |
| JP | 2004308761 A | 11/2004 |
| WO | 2011077148 A1 | 6/2011 |
| WO | 2015064824 A1 | 5/2015 |
| WO | 2020044058 A1 | 5/2020 |
| WO | 2020195434 A1 | 10/2020 |
| WO | 2021/188842 A1 | 9/2021 |

OTHER PUBLICATIONS

International Search Report and Written Opinion in related International Application No. PCT/GB2019/052432 dated, Nov. 11, 2019, pp. 1-17.
International Preliminary Report on Patentability in related International Application No. PCT/GB2019/052432 dated Mar. 2, 2021, pp. 1-9.
GB Application No. GB2003996.2 , "Search Report", Aug. 21, 2020, 2 pages.
PCT Application No. PCT/US2021/023044 , "International Preliminary Report on Patentability", Sep. 29, 2022, 8 pages.
Shigley, Joseph Edward, et al., "Mechanical Engineering Design", McGraw-Hill Higher Education, 5th edition, 1989, 3 pages.
Related U.S. Appl. No. 17/912,475, "Non-Final Office Action", Jan. 5, 2024, 9 pages.
Related JP Application No. 2021-510917, "Notification of Reasons for Rejection", Oct. 10, 2023, pp. 1-5.

* cited by examiner

GASKET

CROSS-REFERENCE TO RELATED APPLICATIONS

This application is the U.S. national phase of International Application No. PCT/GB2019/052432 filed on Aug. 30, 2019, and published on Mar. 5, 2020 as International Publication No. WO 2020/044058 A1, which application claims priority to and the benefit of British Application No. 1814134.1, filed on Aug. 30, 2018, the contents of all which are incorporated herein by reference in their entireties.

FIELD

The present invention relates to gaskets, in particular, but not exclusively, to flange joint sealing gaskets.

BACKGROUND

The use of gaskets in sealing applications is commonplace in many industries. A well-known application for gaskets is to provide fluid sealing between two mating surfaces such as between two ends of adjoining pipes or conduits where they are commonly in the form of a flange joint for ease of assembly and disassembly and for better sealing. A flange joint sealing gasket usually comprises a compressible ring defining an aperture of a size that matches the conduit being sealed and a body that matches the dimensions of the flange mating surfaces.

In high pressure sealing applications, one preferred gasket is known as a Kammprofile gasket. This is effectively a gasket with a series of concentric serrations or a concertina-like profile on one or both facing surfaces. The profile is superimposed onto a solid core, usually metal, by the series of concentric serrations. During the sealing process the overlying softer sealing material of the compressible ring (commonly called the facing) is forced into the gaps between serrations to improve sealing by inducing stress concentrations on the sealing surfaces and sealing microimperfections on the flanges. The serrations also minimise lateral movement of the sealing material of the facing, while the metal core provides rigidity and blowout resistance. Such a profile gives the gasket added strength for high pressure applications. Depending on the application the facing may for example be of exfoliated graphite, polytetrafluoroethylene (PTFE), or of a layered silicate material such as mica or exfoliated vermiculite.

The facings in Kammprofile gaskets are required to be compressible, to provide a good seal, and to be resistant to creep. Depending on the intended use of the gaskets, the facings may be required to have one or more good chemical resistance, good high (such as >150° C.) temperature resistance and good dielectric properties.

However, in the opinion of the present inventors it has not proved possible to find materials for facings which have all properties that may be required. For example materials with excellent thermal resistance may not have adequate chemical resistance or good dielectric properties. Examples are graphite and exfoliated vermiculite. These commonly used materials have excellent thermal and chemical resistance but poor dielectric properties; graphite is inherently an electrical conductor, and exfoliated vermiculite contains water, which reduces its dielectric resistance. These properties limit the use of these materials in gaskets requiring high dielectric properties. A particular problem arises, for example, when the flange joints of pipelines are required to be electrically isolating so that an electric current cannot pass across the joint; or when cathodic protection is employed. This is especially so when the pipelines contain flammable or explosive materials, such as ethylene oxide, or refined hydrocarbons.

In some applications, the fire safety of the flange joint is critical so that gaskets should prevent any risk developing in this respect. The term fire-safe herein may be taken to be in accordance with API SPEC 6FB, typically, the non-bending test, either on-shore or open off-shore.

Another material used as a facing material is polytetrafluoroethylene. This has good dielectric properties and good chemical resistance, but there are compromises in relation to its thermal resistance and mechanical properties, which inhibit its use in certain applications.

The present inventors seek to provide a Kammprofile gasket in which some or all of the disadvantages of existing Kammprofile gaskets are overcome.

SUMMARY

According to a first aspect of the present invention there is provided a gasket comprising a rigid core defining an aperture, the core having a serrated profile on at least one of its upper and lower outer surfaces, wherein the core is divided into upper and lower parts each having a said respective outer surface and also an inner surface opposite the outer surface, the gasket further comprising an optional sealing facing on the at least one outer serrated profile surface, wherein an inner insulating layer is located between the said upper and lower parts so that it is operable to substantially reduce electrical conduction between the said upper and lower parts.

The inner insulating layer may be in the form of a film or sheet. Typically, the layer extends between the upper and lower parts so that the two parts do not come into contact with each other.

Typically, the inner insulating layer can withstand an applied potential difference across the thickness of the layer in kV mm$^{-1}$ at 20° C. and 55% relative humidity of at least 10, more typically, of at least 15, most typically, of at least 20 or at least 25 kV mm$^{-1}$. Preferably, the inner layer is an electrically non-conductive film such as polyimide, polyaryletherketones such as polyetheretherketone, polyetherimide, polyethersulfone, polytetrafluoroethylene, and polytetrafluoroethylene filled with glass.

Preferably, the inner layer extends to the to the region of the proximal (with respect to the aperture) edge of at least one, typically both core part(s). Preferably, the inner layer extends to the region of the distal (with respect to the aperture) edge of at least one, optionally, both core part(s). Preferably, the inner layer extends from the region of the proximal edge to the region of the distal edge of at least one core part with respect to the aperture.

Preferably, the inner surface of at least one and typically both core parts is chamfered at the edge contacting the inner layer that is most proximate to the aperture defined by the gasket, in a ring-shaped gasket the radially innermost edge that contacts the inner layer. The chamfering of the edge reduces the likelihood of the edge cutting into the inner layer in use. Additionally, the chamfer prevents the two core parts coming into contact at the edges. Optionally, the inner surface of at least one and typically both core parts is chamfered at the radially outermost edge that contacts the inner layer. The chamfering of the radially outermost edge reduces the likelihood of the edge cutting into the inner layer in use. Additionally, the chamfer prevents the two core parts coming into contact at a radially outermost edge.

It will be appreciated that the inner surfaces of the upper and lower parts are in contact with the inner layer. Preferably, the inner surface of at least one and typically both core parts has a surface finish such as an inner surface with an Ra surface roughness of less than 64 microinches, more typically less than 32 microinches. Ra may be determined by ASME B46.1.

Providing an Ra surface roughness of less than these values means that the insulating layer will not be damaged, for example cut, due to the roughness of the inner surfaces of the upper and lower parts.

It has been found that for improved sealing the Ra surface roughness of the inner surface of the core parts should be at least 16 microinches, more typically, at least 20 microinches, most typically, at least 24 microinches. Accordingly, the Ra surface roughness of the inner surface of the core parts may be in the range 16 to 64 microinches, more typically, 20 to 48 microinches, most typically, 24 to 32' microinches. Providing an Ra surface roughness at these values means that there is a sufficient seal between the upper part, lower part and the insulating layer. In other words, the number of possible leak paths in the gasket are reduced when the Ra surface roughness is at least 16 microinches. The provision of the insulating layer between the upper part and the lower part seals the leak path when there is a Ra surface roughness of at least 16 microinches.

Ra may be defined as "the arithmetic average of the absolute values of the profile height deviations from the mean line, recorded within the evaluation length." This may be represented as:

$$Ra = (1/L)\int_0^L |Z(x)|dx$$

Where L=evaluation length

Z(x)=the profile height function

In other words, Ra is the average of a set of individual measurements of a surface's peaks and valleys and provides a measure of surface roughness.

Preferably, the core parts are made of suitable material. Suitable materials for the core parts may be selected from steel, typically stainless steel, Hastelloy C, Monel 400, Alloy 20, Inconel 625, 600 or X-750, Duplex Stainless Steels, Titanium and Nickel 400. More typical stainless steels may be selected from 316 stainless steel, 316L, 304, 310, 321, 347 and 430.

Suitably the inner layer comprises a pre-formed film.

In an alternative embodiment a flowable coating may be applied to one inner surface of one of the core parts or both inner surfaces of both core parts. The flowable coating may dry or cure to form the inner layer.

It is important that the inner layer has a sufficient thickness to perform its function. Surprisingly we have determined that a relatively thin inner layer can make a large difference to the overall properties of the gasket, particularly fire-safe gaskets. We have found that good performance enhancements can be achieved in such embodiments of the invention in which the inner layer suitably has a mean thickness of at least 50 µm, and preferably has a mean thickness of at least 75 µm.

It might have been expected that the inner layer should be thick in order to make the largest possible difference to the overall properties of the gasket. However we have found, surprisingly, that a thick inner layer can be detrimental to the functioning of Kammprofile gaskets in fire-safe applications. We have determined that the inner layer in such embodiments suitably has a mean thickness not exceeding 300 µm, preferably not exceeding 200 µm.

Thus we have determined the inner layer for fire-safe gaskets preferably has a mean thickness in the range 50-200 µm, and most preferably 75-200 µm.

For other applications, the inner layer may be in accordance with any of the thicknesses defined above including any of the lower range limits mentioned but may in addition be up to or greater than 0.5 mm or up to or greater than 1 mm in thickness.

Suitably the inner layer is secured to the inner surfaces of one or both upper and lower parts by an adhesive composition. A suitable adhesive composition such as a contact adhesive, typically an acrylic contact adhesive. A suitable adhesive is 3M77 spray adhesive. Alternatively or additionally, the inner layer may be secured to the inner surface by a suitable non-conductive fastener or fixing. A suitable fixing is bolts made from non-conductive material such as a polymeric material or composite.

Preferably, the gasket is a fire-safe gasket. Typically, the fire-safe gasket is in accordance with API Spec 6FB, non-bending test, on-shore or open off-shore as set out above.

Preferably the inner layer entirely overlies the inner surface of the upper and lower parts that would otherwise meet in use, in order to achieve the desired benefit from using the inner layer. For example when the core parts are steel the inner layer being insulating must entirely cover the steel in order for the gasket to have the dielectric resistance benefit. Suitably the inner layer has the same footprint as the inner surface of the core parts, or has a footprint which extends beyond the footprint of the core parts.

Suitable the inner layer is of a substantially incompressible or barely compressible material. Suitably it is of an unexpanded thermoplastic material which is compressible to a very limited extent permitted by its bulk structure.

Suitably the optional sealing facing is of a compressible material, and may preferably be in particulate, sheet or fibrous form. In use, when the gasket is located between opposed surfaces of pipes or conduits under a compressive load, the facing layer is compressed. Typically, the compression of the facing layer in use is within the range 30-90% compression in use ((initial−final)/initial thickness× 100), more typically, 40-80%, most typically, between 50-70% compression. In any case, the facing layer will typically have more than 30% compression, more typically, more than 40% compression and most typically more than 50% compression in use. A suitable compression test is ASTM F36-15 carried out at room temperature−25° C.

Suitably the mean thickness of the facing layer when uncompressed, prior to use, is at least 0.2 mm, preferably at least 0.4 mm, preferably at least 0.5 mm, and in some embodiments at least 0.6 mm.

Suitably the mean thickness of the facing layer when uncompressed, prior to use, is up to 4 mm, preferably up to 2 mm, and most preferably up to 1 mm.

Suitably the thickness of the facing layer when uncompressed, prior to use, exceeds the thickness of the inner layer. Suitably the ratio the thickness of the facing layer, when uncompressed, prior to use, to the thickness of the inner layer is at least 2, preferably at least 3, and most preferably at least 4.

Suitably the thickness of the facing layer when compressed, in use, exceeds the thickness of the inner layer.

Suitably the ratio the thickness of the facing layer, when compressed, in use, to the thickness of the inner layer is at least 1.5, and preferably at least 2.

The provision of a third layer, in contact with the opposite side of the facing layer to the serrated profile, is not excluded in the practice of the present invention. When a third layer is provided it may introduce or boost to a mechanical, chemical or electrical property which is absent or inadequate in the facing layer and/or the inner layer. When a third layer is employed it may be identical to the inner layer or it may be different. If different it is preferably generally as described above for the inner layer. However in preferred embodiments the facing consists of the inner layer and the facing layer only.

However, it is possible for each inner surface to have an inner layer thereon so that there are two inner layers. These inner layers may be the same or different. Preferably, they are the same material. Generally, only one inner layer is utilised.

A particular difficulty has been in obtaining a Kammprofile gasket which has good dielectric properties, alongside good mechanical properties, and good thermal and chemical resistance. Preferred embodiments of the invention which will now be described which address this particular difficulty, and thus focus on achieving improvement in dielectric properties, whilst maintaining other properties. However it should be understood that this is an illustration of the present invention, and that the principle of using a inner layer in order to introduce or boost a property deficient in the material of the facing layer is of more general applicability.

In some existing gaskets the single-layer facings are of graphite, which has excellent mechanical properties and thermal and chemical resistance, but, being an electrical conductor, extremely poor dielectric properties. This makes it unsuitable as a gasket for pipelines which must have electrical isolation of flange joints, or cathodic protection systems. This is especially so when the pipelines contain flammable or explosive materials, such as ethylene oxide, or refined hydrocarbons. In other existing gaskets the single-layer facings are of layered silicate products, for example those containing exfoliated vermiculite. However exfoliated vermiculite also has poor dielectric properties due to water in its structure.

In accordance with the present invention the inner layer is preferably formed of a thermoplastic or thermosetting polymer having high dielectric strength and optionally one of high (such as >150° C.) temperature resistance and high chemical resistance. Preferred polymers have at least high dielectric strength and high (such as >150° C.) temperature resistance, or high chemical resistance and high dielectric strength. Especially preferred polymers have all three of high (such as >150° C.) temperature resistance, high chemical resistance and high dielectric strength.

Suitably the inner layer is comprises or consists of a thermoplastic polymer, preferably selected from the following classes:
  polyaryletherketone (PAEK) (of which a particularly preferred example is polyetheretherketone, PEEK)
  polyimide (PI)
  fluorinated ethylene propylene copolymer (FEP)
  polyetherimide (PEI)
  polyethersulfone (PES)
  polytetrafluoroethylene (PTFE)
  ethylene-chlorotrifluoroethylene copolymer (E-CTFE)
  ethylene-tetrafluoroethylene copolymer (ETFE)
  polycarbonate (PC)
  polychlorotrifluoroethylene (PCTFE)
  polyvinylidenefluoride (PVDF).

Alternatively the inner layer may comprise or consist of a thermosetting polymer, preferably selected from the following classes:
  silicone polymers
  polyimide (thermosetting)
  bis-maleimides (BMI)
  epoxy polymers
  phthalonitrile resins.

The thermoplastic and thermosetting polymers described may be used unfilled, or may be filled with inorganic inclusions, for example glass fibres or glass microspheres. Currently available products include a polycarbonate—30% wt glass fibre film and a polytetrafluoroethylene—25% wt glass fibre film.

The following polymers have good thermal resistance in addition to other suitable properties such as good chemical resistance and dielectric properties, and are preferred for use in the inner layer:
  polyaryletherketone (PAEK) (of which a particularly preferred example is polyetheretherketone, PEEK)
  polyimide (PI)
  fluorinated ethylene propylene copolymer (FEP)
  polyetherimide (PEI)
  polyethersulfone (PES)
  polytetrafluoroethylene (PTFE).

Especially preferred polymers for use as the inner layer are polyimides (PI) and polyaryletherketones (PAEK), especially polyetheretherketone, PEEK. These materials have excellent dielectric properties, high temperature resistance and chemical resistance, as well as the mechanical properties suitable to retain the integrity of the layer when located between the two parts of a Kammprofile gasket during rigorous use conditions. Polyaryletherketones are a class of polymers characterised by the presence of backbone aryl (generally phenyl), ketone and ether groups. They include several important sub-classes of polymers including polyetheretherketones (PEEK), polyetherketones (PEK), polyetherketoneketones (PEKK), polyetheretherketoneketones (PEEKK) and polyetherketoneetherketoneketones (PEKEKK).

Polyetheretherketones (PEEK) are a particularly preferred class of polyaryletherketones for use in the present invention and they may generally be exemplified by the structure:

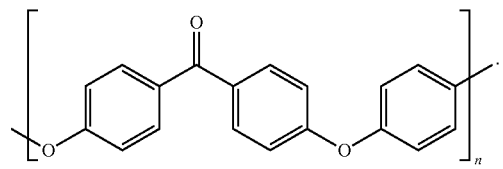

Films of polyetheretherketone can be sourced from Victrex.

Other polyarylether compounds have the following structures.

Polyetherketones (PEK) have the structure

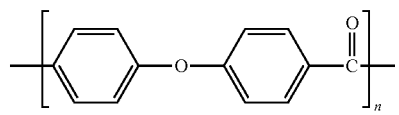

Polyetherketoneketones (PEKK) have the structure

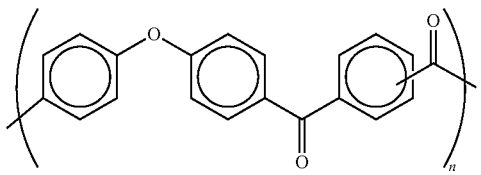

Polyetheretherketoneketones (PEEKK) have the structure

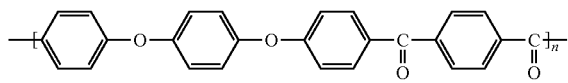

Polyetherketoneetherketoneketones (PEKEKK) have the structure

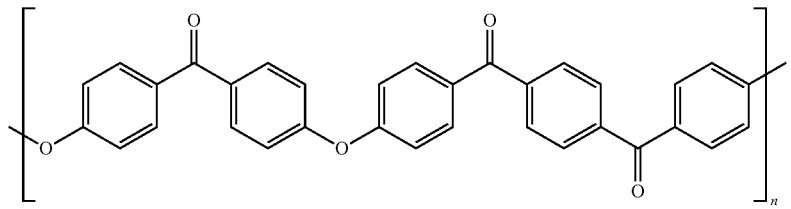

Polyimides are formed by reaction between a dianhydride and a diamine, or by reaction between a dianhydride and a diisocyanate and have the general structure:

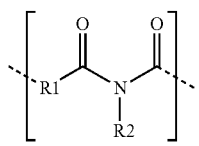

Polyimides may be thermoplastic or thermosetting.

Polyimides are available in film form under the Trade Mark UPILEX (RTM of Ube Industries). UPILEX which is the product of a polycondensation reaction between biphenyltetracarboxylic dianhydride and diamine and is believed to have the structure:

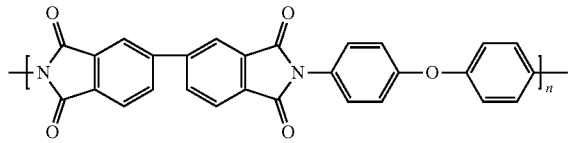

Polyimide is also available under the Kapton Trade Mark from Dupont. Fluorinated ethylene propylene copolymers are copolymers of hexafluoropropylene and tetrafluoroethylene. They can be sourced from DuPont.

Polyetherimides are arylene polymers which have backbone ether groups. They can be sourced from Sabic.

Polyethersulfones are characterised by the sub-unit —O-aryl-$SO_2$-aryl. They can be sourced from Goodfellow Corp.

Polytetrafluoroethylenes are polymers of tetrafluoroethylene and can be sourced from DuPont.

Ethylene-chlorotrifluoroethylene copolymers are partially fluorinated, partially chlorinated aliphatic copolymers. They can be sourced from Solvay.

Ethylene-tetrafluoroethylene copolymers are aliphatic fluorinated polymers having a lower degree of fluorination than polytetrafluoroethylene. They can be sourced from DuPont.

Polycarbonates are arylene polymers containing carbonate groups (—O—(C=O)—O—) in the polymer backbone. They can be sourced from Tekra.

Polychlorotrifluoroethylenes are aliphatic chlorinated and fluorinated polymers. They can be sourced from Allied Signal.

Polyvinylidenefluorides are aliphatic fluorinated polymers. They can be sourced from Solvay. Silicone polymers are branched polysiloxane materials and may be sourced from Tego Chemie.

Bis-maleimides (BMI) may be produced by a condensation reaction of a diamine with maleic anhydride. They are a relatively young class of thermosetting polymers. Further information on BMI polymers is available at webpage: https://polycomp.mse.iastate.edu/files/2012/01/6-Bismaleimide-Resins.pdf Epoxy polymers are polymers in which an epoxide-containing precursor, for example bisphenol A or F, is cured by means of a curing agent, typically an acid, acid anhydride, phenol, alcohol, thiol or (most commonly) and amine, Epoxy polymers can be sourced from Alchemie Ltd.

Phthalonitrile resins are derived from bis-phthalonitrile monomers and a variety of curing agents, including aromatic polyamines. Further information is available at webpage: Fire Performance of Phthalonitrile Resins/Composites, S. B. Sastri, J. P. Armistead, T. M. Keller and U. Sorathia, made available at webpage: http://fire.nist.gov/bfrlpubs/fire96/PDF/f96127.pdf Preferred polymers for use in the present invention have an extension to break value of at least 50%, preferably, at least 82%, more preferably at least 100%, and most preferably at least 200%, when tested for tensile properties in accordance with the method of ASTM F152-95(2009). It is believed that the ability of the inner layer to stretch in response to applied stress is of importance in achieving good results in a gasket assembly.

In accordance with the present invention the facing layer may be selected from a wide range of materials, including materials having poor dielectric properties, and which previously would have been excluded from certain application areas requiring high dielectric strength. The choice of material will be determined by the final application. If necessary, fire-safe materials can be utilised. Preferably the materials of the facing layer have excellent thermal resistance. Preferred materials for the facing layer are inorganic materials, including layered silicates, ceramics and graphite. Especially preferred materials for the facing layer include layered silicates and graphite. The term layered silicate in this specification includes micas and vermiculites. Mixtures of such materials could be employed. It should be noted that the term vermiculite in this specification includes materials that may sometimes be called biotite, hydrobiotite and phlogopite (nomenclature in this area being contentious). Micas are useful in the present invention for their good dielectric properties.

Preferred vermiculite for use in the present invention is or comprises exfoliated vermiculite, which may be chemically exfoliated vermiculite (CEV), or thermally exfoliated vermiculite (TEV), or a mixture of CEV and TEV. It may be mixed with other minerals. Thus, other preferred materials include exfoliated vermiculite (which may comprise CEV, or TEV, or a mixture of CEV and TEV), in admixture with other minerals, for example one or more of talc, mica and graphite.

Especially preferred materials for the facing layer include exfoliated vermiculite, preferably, chemically exfoliated vermiculite and exfoliated graphite; in the case of vermiculites optionally admixed with further mineral materials.

Thus, even if the material of the facing layer has poor dielectric properties, the gasket can still have good dielectric properties overall on selection of a suitable material for the inner layer.

In one preferred embodiment the inner layer comprises or consists of polyimide and the facing layer comprises or consists of exfoliated vermiculite, preferably, chemically exfoliated vermiculite.

In one preferred embodiment the inner layer comprises or consists of polyetheretherketone and the facing layer comprises or consists of exfoliated vermiculite, preferably, chemically exfoliated vermiculite.

In one preferred embodiment the inner layer comprises or consists of polyimide and the facing layer comprises or consists of exfoliated graphite.

In one preferred embodiment the inner layer comprises or consists of polyetheretherketone and the facing layer comprises or consists of exfoliated graphite.

In another embodiment the inner layer comprises or consists of polytetrafluoroethylene and the facing layer comprises or consists of exfoliated vermiculite, preferably, chemically exfoliated vermiculite.

In another embodiment the inner layer comprises or consists of polytetrafluoroethylene and the facing layer comprises or consists of exfoliated graphite.

It was mentioned above that polytetrafluoroethylene has good dielectric properties and good chemical resistance but there are compromises in relation to its thermal resistance and mechanical properties, which inhibit its use in certain rigorous applications. That statement related the use of polytetrafluoroethylene as the facing material. Polytetrafluoroethylene may still be of value, in the present invention, as the material of the inner layer. A polytetrafluoroethylene inner layer can enhance the dielectric and chemical resistance of the facing.

As indicated above and in claim 1, the invention may be put into practice with the type of gasket which has a rigid core defining an aperture, with an upper and lower serrated profile surface; for example, a Kammprofile gasket. The paragraphs which follow describe Kammprofile gaskets which are particularly suitable for use in the present invention.

The split core of a Kammprofile gasket which may be used in the present invention can be of any design. For example, it could be a ring-shape substantially matching the ring-shape of the facings; it could have an integral outer guide part, which may also be divided into upper and lower parts or could be integral with only one of the upper or lower parts, and which extends distally (relative to the aperture) beyond the serrations and the facings; it could have a separate, loose fitting outer guide part, which may also be divided into upper and lower parts, and which extends distally beyond the serrations and the facings; it could have projections or lugs extending distally or proximally, beyond the serrations and the facings; or it could have a compression part extending proximally from the proximal edges of the serrated core parts and the facings, typically a proximally located closely circumferentially fitting compression ring for improved sealing properties. The proximally located compression ring may be thicker than the core and facings. Suitable inner compression rings of this kind are described in WO2011/077148. Suitable materials for the core parts may be selected from steel, typically stainless steel, Hastelloy C, Monel 400, Alloy 20, Inconel 625, 600 or X-750, Duplex Stainless Steels, Titanium and Nickel 400. More typical stainless steels may be selected from 316L, 304, 310, 321, 347 and 430.

The outer guide part mentioned above may be made from an insulator of dielectrically strong material so that it may come into contact with both upper and lower core parts and not break down as an insulator in use. Suitable insulating materials may be thermosetting polymers such as those described above for example glass reinforced epoxy resin. The outer guide part does not necessarily have to be continuous throughout and may have other constructions such as a spoke arrangement joined to the core parts at spaced intervals around the periphery thereof to reduce the use of materials.

Generally, the gaskets of the present invention are ring shaped and typically define a centrally located aperture. When a compression ring is located in this aperture it will therefore generally also be ring shaped and be dimensioned so that it may provide close fitting engagement with the proximal peripheral edges of core parts along the outer circumference of the compression ring. The compression ring generally has a second aperture so that when located in position the second aperture becomes the aperture of the gasket rather than that defined by the core.

The gasket of the present invention, whichever the gasket type is, may be required to operate under normal operating pressures between 100 KPa and 43,000 KPa, more typically between 10,000 KPa and 20,000 KPa.

In accordance with a second aspect of the present invention there is provided a method of producing a gasket of the first aspect, comprising:

providing a core having upper and lower mating parts, each part having an aperture and each part having an outer and an inner surface, at least one part having a set of concentric serrations around the aperture on the outer surface of the said core part;

optionally locating a facing layer on at least one core part outer surface;

locating an inner insulating layer between the core parts;

and securing the inner layer between the upper and lower parts so that the inner surfaces thereof are in facing arrangement and are prevented from coming into direct contact by the inner layer.

In accordance with a third aspect of the present invention there is provided the use of a gasket of the first aspect as a sealing gasket which can be used at temperatures of at least 120° C. and to provide resistance to electrical breakdown on application of a potential difference of at least 15 kV applied across the thickness of the inner layer. In some examples, the sealing gasket can be used with temperatures of at least 150° C. and preferably to provide resistance to electrical breakdown on application of a potential difference of at least 15 kV applied across the thickness of the inner layer.

In accordance with a fourth aspect of the present invention there is provided the use a sealing gasket which can be used at temperatures of at least 200° C. and to provide resistance to electrical breakdown on application of a potential difference of at least 25 kV applied across the thickness of the inner layer. In one example, the sealing gasket can be used at temperatures of at least 250° C. and to provide resistance to electrical breakdown on application of a potential difference of at least 25 kV applied across the thickness of the inner layer.

Suitably the third and fourth aspects use sealing gaskets which also have good mechanical properties and chemical resistance.

Electrical breakdown may be measured as electrical breakdown voltage or dielectric breakdown voltage using, for example, ASTM D149-09. A suitable test may also be carried out as follows. The efficacy of dielectric materials in the inner layer may be investigated by a laboratory test employing an anode and cathode applied to opposed surfaces of the gasket. Alternating voltage at a commercial power frequency (60 Hz) was applied to a test gasket. The gaskets under test were 25 mm square and had been conditioned by placing in an oven at 100° C. for 1 hour before placing in a desiccator. The anode and cathode electrodes consist of opposing cylindrical rods 6.4 mm in diameter with edges rounded to 0.8 mm radius. The electrodes were made from stainless steel. The anode and cathode were applied to opposed surfaces of the test gaskets to give a high potential difference. The potential difference was increased until breakdown occurred. The start voltage for the test was 2.5 kV and was held for a total of 10 secs. If no failure was detected, the voltage was increased by 0.5 kV and again held for 10 secs. This was repeated until dielectric failure of the test specimen occurred. Failure usually occurred within 1-2 secs of applying the relevant voltage. On breakdown dielectric resistance was greatly reduced or lost entirely and a high current was permitted to flow. This high current was signalled by a sounder and by a light, each connected in the circuit. The tests may be carried out at suitable temperatures. In the absence of information to the contrary the kV values may be assumed to relate to a temperature of 20° C. and 55% relative humidity.

The first inner layer is generally in contact with the respective inner surfaces of the upper and lower parts at least where they would otherwise come into contact with each other. Optionally, one or more further inner layers may be provided between the upper and lower parts. The further inner layer may or may not be contiguous with the first or other inner layers. The further inner layer may overlap with the first inner layer or only partially extend across the other layer(s).

The further inner layer may increase a desirable property, for example a partial ring of graphite or vermiculite such as exfoliated vermiculite on top of the inner insulating layer to enhance fire safety.

The gasket may have a retaining feature for the further inner layer formed into one of the upper or lower parts. The retaining feature may be formed in the one of the upper or lower parts to retain the further inner layer.

The retaining feature may comprise serrations or a lip seal to provide sealing against the further inner layer. Additionally, the first inner layer may by this means be protected from the sealing material, serrations or upper and/or lower parts. Advantageously, such an arrangement may assist in high pressure sealing applications.

As mentioned above, in any of the embodiments herein, the core parts may also accommodate a proximally located compression ring such as those described in WO2011/077148. For the purposes of the present application, the compression ring may be said to comprise deformable material defining a second aperture therein, the ring having a proximal inner edge defining the second aperture and an outer distal region designed to be secured to the core parts so that the compression ring is held securely by the core parts. The thickness of the compression ring is typically greater than the combined thickness of the rigid core together with any sealing facings thereof so that in use the compression ring compresses to a greater extent than the core and the optional facings. In accordance with the invention, the compression ring may also be formed into two axially displaced parts to prevent charge leakage by locating a dielectrically stronger material therebetween. In one embodiment, the compression ring has a thermosetting polymer of dielectrically strong material such as glass reinforced epoxy resin between the said two parts to provide the greater dielectric resistance. The compression ring may be secured to the core parts by adhesive, friction fit, mutually overlapping parts or mechanical fixings or any combination thereof.

Suitable materials for the compression ring part(s) include PTFE, wherein this PTFE is preferably softer than the sealing facing of the outer part, more preferably a highly compressible biaxially orientated microcellular PTFE based material. Any dielectric resistant material located between axially displaced compression ring parts will generally be thinner than the combined thickness of the core together with the optional facings thereof.

As mentioned above the compression ring is preferably more compressible than the core facings so that in use the inner material is only compressed as far as the less compressible outer portion will allow.

In any embodiments herein, a thicker compression ring is positioned so that the faces thereof extend axially beyond the core and any optional sealing facing on both upper and lower faces thereof, more typically, to a generally equivalent extent.

In one embodiment, there is provided a gasket comprising: a rigid core comprising a first part and a second part, the first part and the second part each comprising an inner surface and an outer surface, wherein at least one of the outer surface of the first part and the outer surface of the second part comprises a serrated profile; and an insulating layer between the inner surface of the first part and the inner surface of the second part to substantially reduce electrical conduction between the first part and the second part. The first part and the second part may be equivalent to the upper part and the lower part described above and all of the features described above are applicable to this embodiment too.

The provision of a gasket including these features improves the electrical insulation between a first part and a second part of the core of the gasket. Therefore, if one part of the core of the gasket is subject to an electrical charge or current, the insulating layer may prevent or reduce the transfer of the electrical charge or current to the other part. As such, the gasket may be used in situations in which electrical insulation across the gasket is important.

The gasket may include a sealing facing on the at least one outer serrated profile surface. The facing layer has been described in relation to other embodiments above.

The inner surface of the first part and the inner surface of the second part may each comprise an abutting region that abuts the insulating layer, wherein the profile of the insulating layer substantially matches the profiles of the abutting regions of the inner surfaces of the first part and second part. Providing a matching profile for the abutting region of the inner surface and the insulating layer means that the insulating layer is confined between the extent of the abutting regions of the inner surfaces of the first part and the second part. Therefore, there is not an excess of insulating layer that extends beyond the core of the gasket.

The inner surface of first part and the inner surface of the second part may each comprise an abutting region that abuts the insulating layer, wherein the profile of the insulating layer is configured to extend beyond the profiles of the abutting regions of the inner surfaces of the first part and second part. As the insulating layer extends beyond the profile of the abutting region of the inner surface of the first part and the second part, the insulating layer may also be held between adjacent elements, such as an interior member or an exterior member. As such, the insulating layer may be held more securely in use, for example between locating grooves in the interior member and the exterior member.

The gasket may comprise an exterior member, wherein the exterior member is located outside of the core and abuts the core. In one example, the exterior member is made of a non-electrically conducting material, such as an epoxy resin.

The exterior member may be made of an epoxy resin and therefore provide further electrical insulation in the gasket.

The gasket may include an interior member, wherein the interior member is located within the core and abuts the core. The interior member may define an aperture and separate the core from the aperture in use. As such, the interior member may provide thermal insulation between the core and any fluid passing through the gasket. In examples, the interior member is made of a non-electrically conducting material, such as Polytetrafluoroethylene (PTFE). In one example, the interior member is made of a glass filled epoxy material. As discussed above, providing a non-conducting interior member and a non-conducting exterior member substantially reduces electrical arcing across the gasket.

The core may be coupled to the interior member and/or the exterior member via a press fit. The press fit ensures that the core is held rigidly between the interior and the exterior members.

In one example, the interior member is an interior ring and the exterior member is an exterior ring.

The core, the interior member and the exterior member may be complimentary shapes to couple the core to the exterior member and the interior member. The exterior member may comprise a first exterior member and a second exterior member, the first exterior member and the second exterior member each comprising an inner surface and an outer surface. As described above, the insulating layer may extend in such a way that it is coupled between the first exterior member and the second exterior member.

At least part of the inner surface of the first exterior member may be configured to abut at least part of the inner surface of the second exterior member.

The interior member may comprise a first interior member and a second interior member, the first interior member and the second interior member each comprising an inner surface and an outer surface. As described above, the insulating layer may extend in such a way that it is coupled between the first exterior member and the second exterior member.

At least part of the inner surface of the first interior member may be configured to abut at least part of the inner surface of the second interior member.

Assembling the interior member, the core and the exterior member together can be difficult, especially in the embodiment in which the interior member is an interior ring, the core is substantially ring shaped and the exterior member is an exterior ring. Splitting the exterior member into a first exterior member and a second exterior member and splitting the interior member into a first interior member and a second interior member reduces the difficulty of the assembly. For example, a part of the first exterior member may overlap with a portion of the core such that they are engaged together. Further, a portion of the first interior member may overlap with a portion of the core such that they are engaged together. In addition, the split may accommodate the provision of one or more lugs, as discussed below.

At least one of the first part and the second part may comprise one or more lugs. In use, the lugs increase the abutting area of the first part and the second part, thereby spreading the load between the first part and the second part of the core of the gasket and thereby reducing the load on the insulating layer. The provision of the lugs also reduces the stresses on the insulating layer, which in turn reduces localised creep of the insulating layer.

The one or more lugs or protrusions may be located towards the inner surface of at least one of the first part and the second part such that the profile of the inner surface of at least one of the first part and the second part extends beyond the profile of the outer surface of the at least one of the first part and the second part.

At least one of the interior member and the exterior member may comprise one or more recesses configured to receive the one or more lugs.

Providing recesses and lugs or protrusions assists with the coupling of the core with the interior member and the exterior member, reducing the chances of them from separating during assembly or use.

At least one of the first part and the second part may comprise one or more recesses.

At least one of the interior member and the exterior member may comprise one or more protrusions configured to be received in the one or more recesses in the at least one of the first part and the second part.

The invention will now be further described, by way of example, with reference to the accompanying drawings.

BRIEF DESCRIPTION OF DRAWINGS

FIG. 1b shows a perspective view of the gasket of FIG. 1a;

FIG. 1c shows a section along line A-A of FIG. 1a;

FIG. 2b shows a perspective view of the gasket of FIG. 2a;

FIG. 2c shows a section along line A-A of FIG. 2a;

FIG. 3b shows a perspective view of the gasket of FIG. 3a;

FIG. 3c shows a section along line A-A of FIG. 3a;

FIG. 4b shows a perspective view of the gasket of FIG. 4a;

FIG. 4c shows a section along line A-A of FIG. 4a;

FIG. 7b shows a variation of the embodiment of FIG. 7a;

FIG. 8b shows an exploded view of the gasket of FIG. 8a;

FIG. 9b shows an exploded view of the gasket of FIG. 9a;

DESCRIPTION OF EMBODIMENTS

Figure 1A:
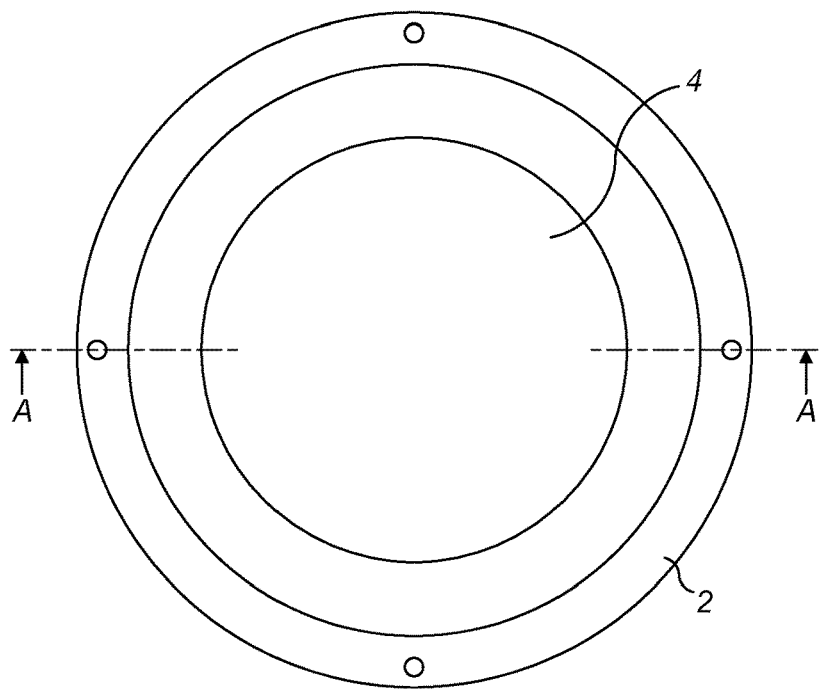
FIG. 1a shows a plan view of a gasket according to the present invention.
Figure 1B:
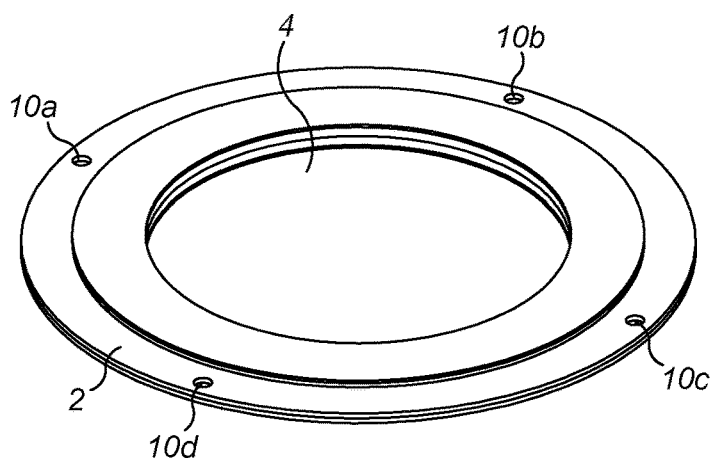
Figure 1C:
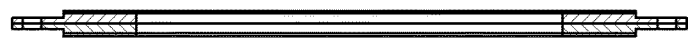
Figure 1D:
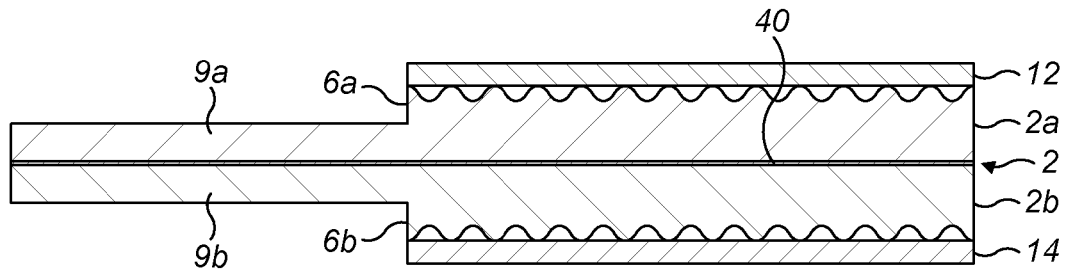
FIG. 1d shows an enlarged view of a section of the ring revealing the layered arrangement.
Figure 1E:
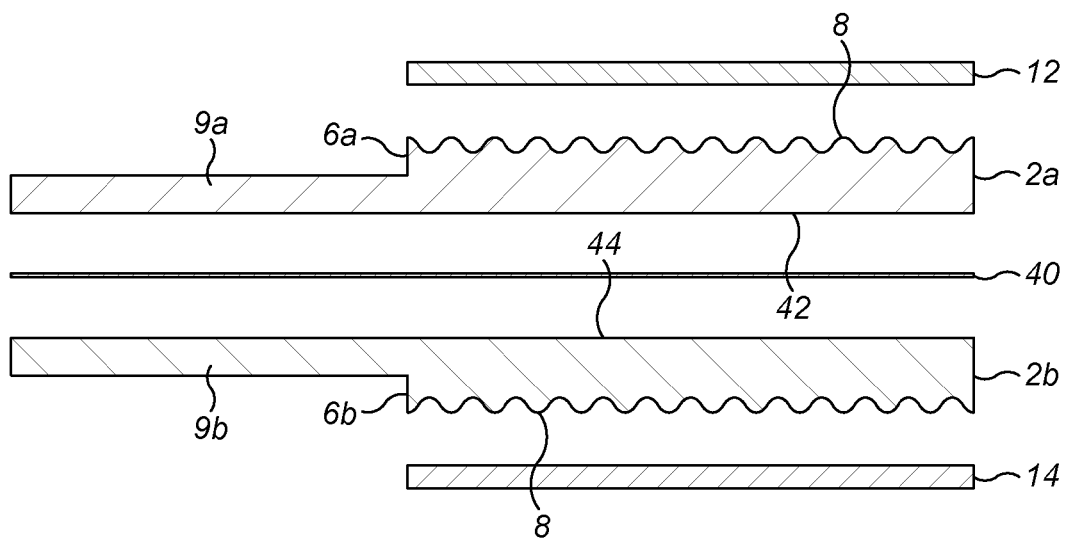
FIG. 1e shows the view of FIG. 1d with the layers separated for illustrative purposes.
Figure 2A:
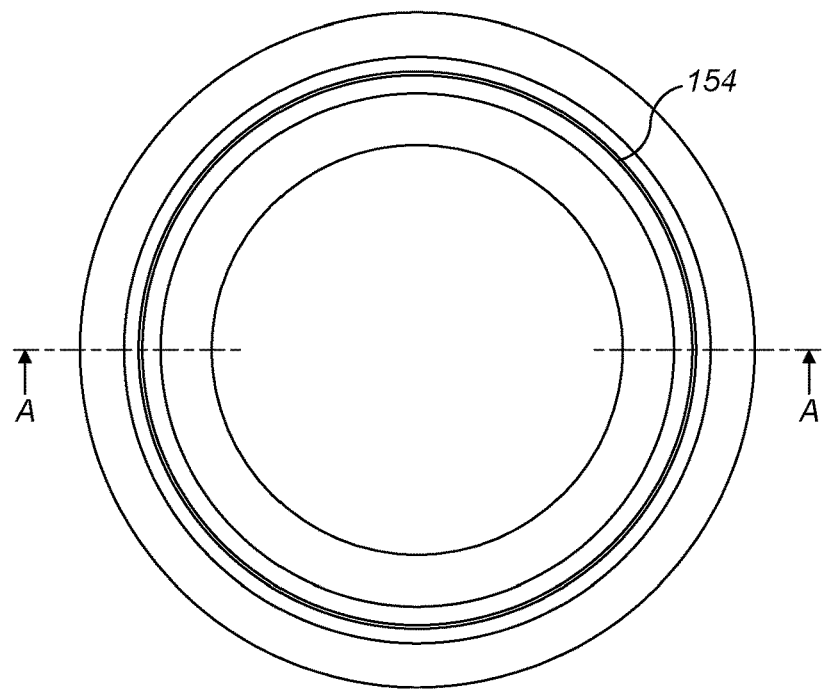
FIG. 2a shows a plan view of a further gasket according to the present invention.
Figure 2B:
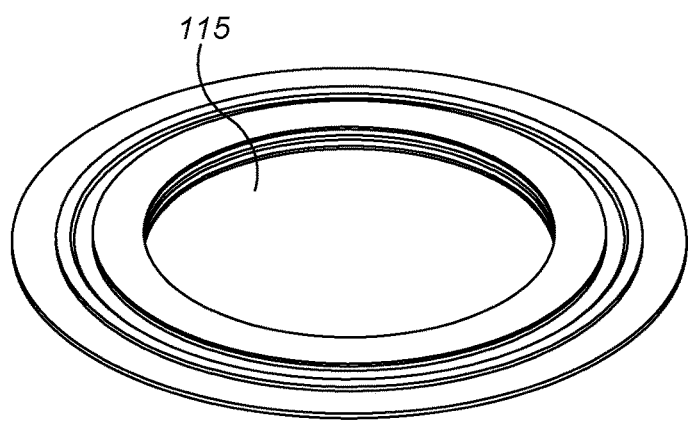
Figure 2C:
Figure 2D:
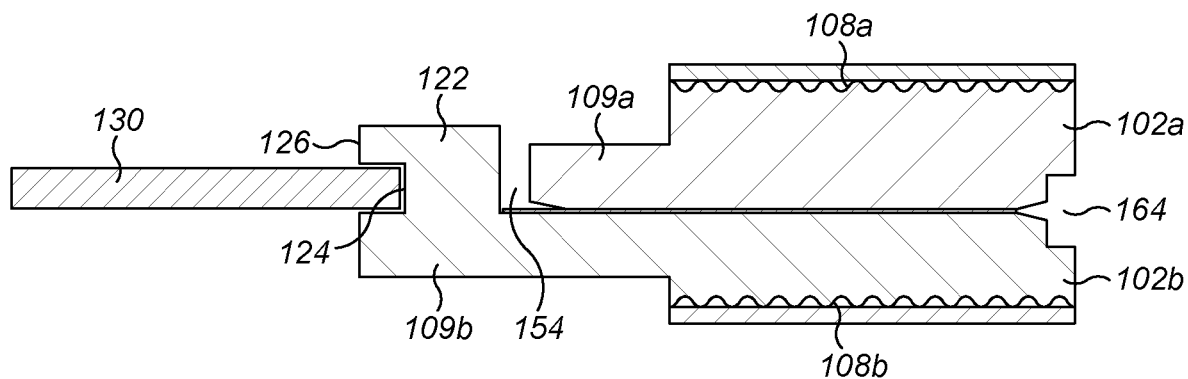
FIG. 2d shows an enlarged view of a section of the ring revealing the layered arrangement.
Figure 2E:
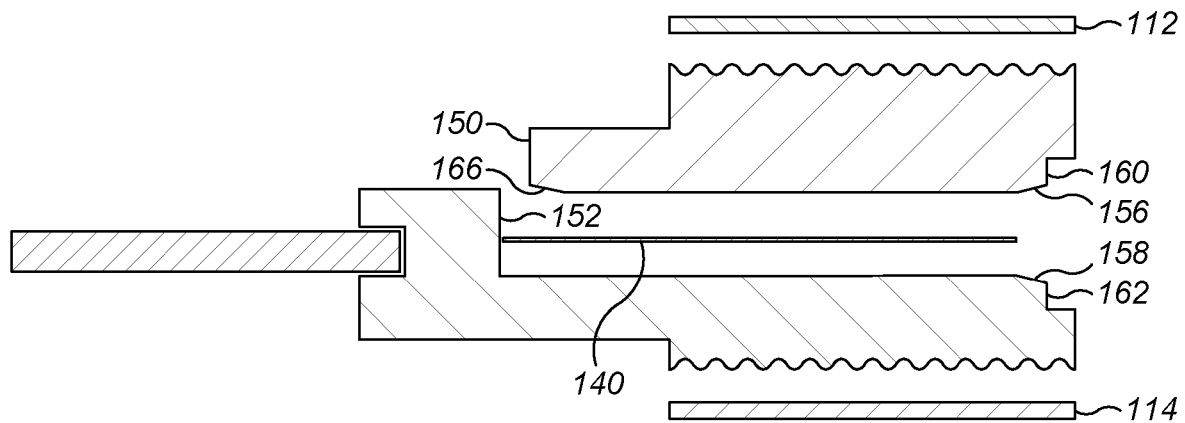
FIG. 2e shows the view of FIG. 2d with the layers separated for illustrative purposes.
Figure 3A:
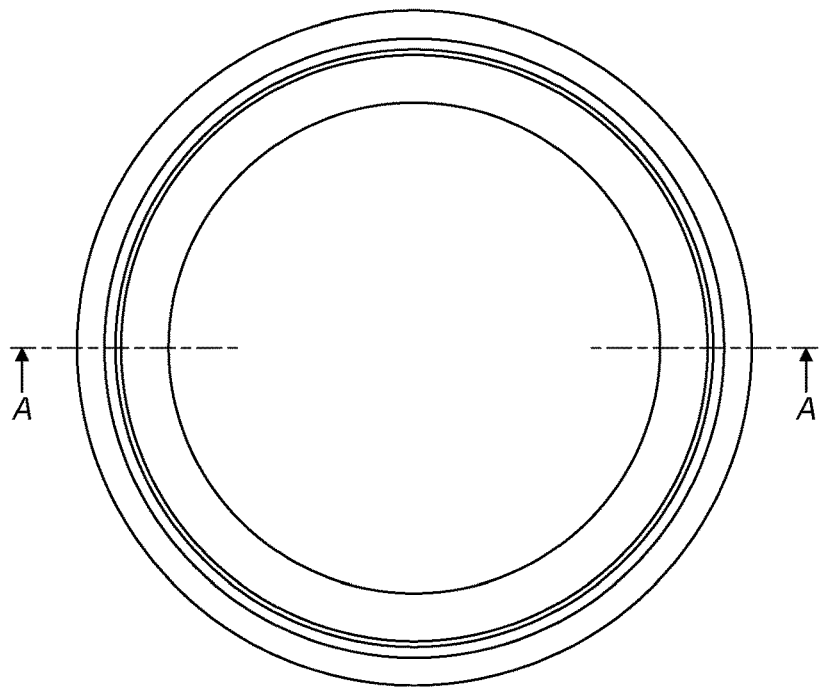
FIG. 3a shows a plan view of a still further gasket according to the present invention.
Figure 3B:
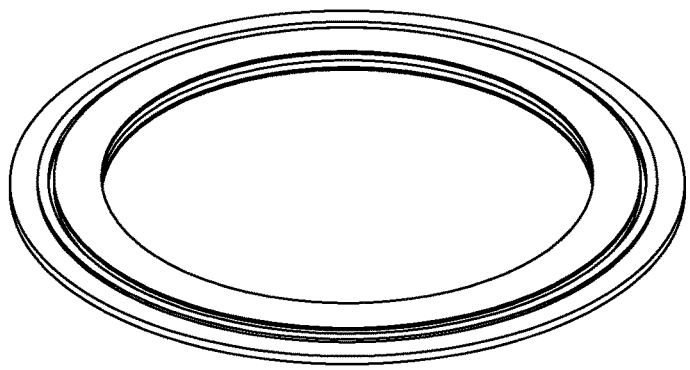
Figure 3C:
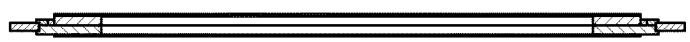
Figure 3D:
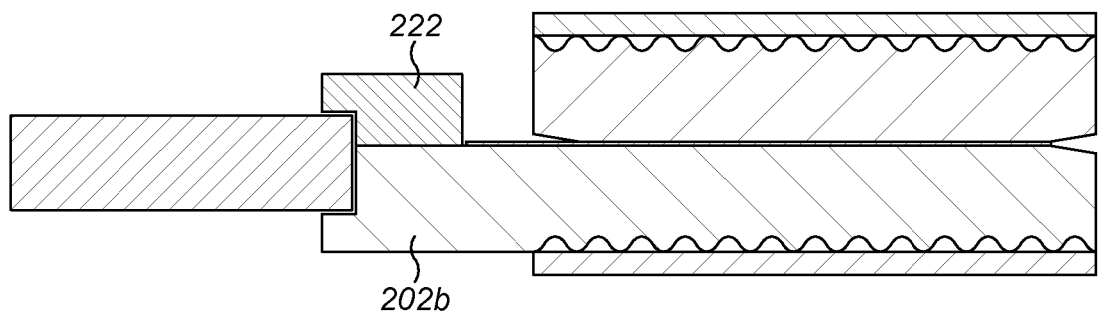
FIG. 3d shows an enlarged view of a section of the ring revealing the layered arrangement.
Figure 3E:
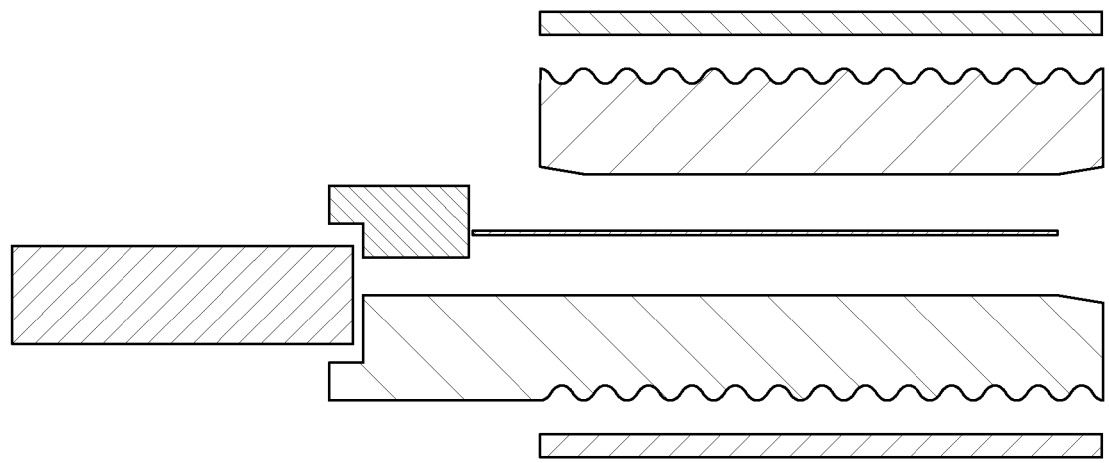
FIG. 3e shows the view of FIG. 3d with the layers separated for illustrative purposes.
Figure 4A:
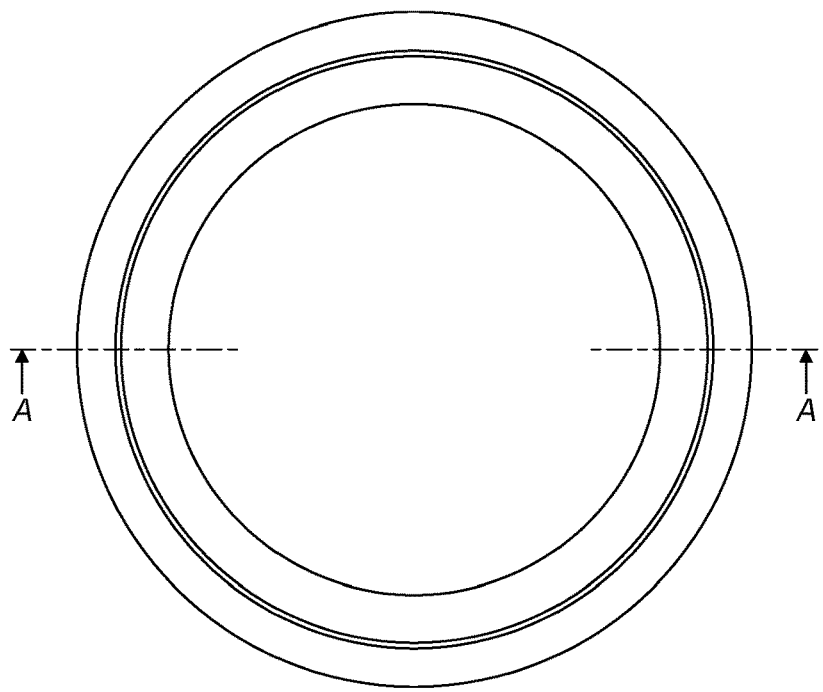
FIG. 4a shows a plan view of a still further gasket according to the present invention.
Figure 4B:
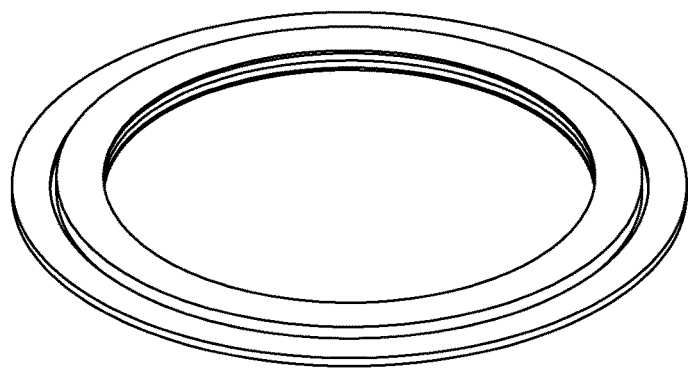
Figure 4C:
Figure 4D:
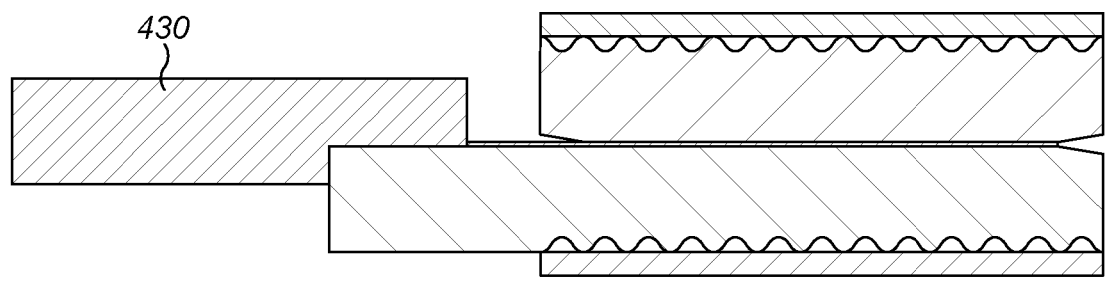
FIG. 4d shows an enlarged view of a section of the ring revealing the layered arrangement.
Figure 4E:
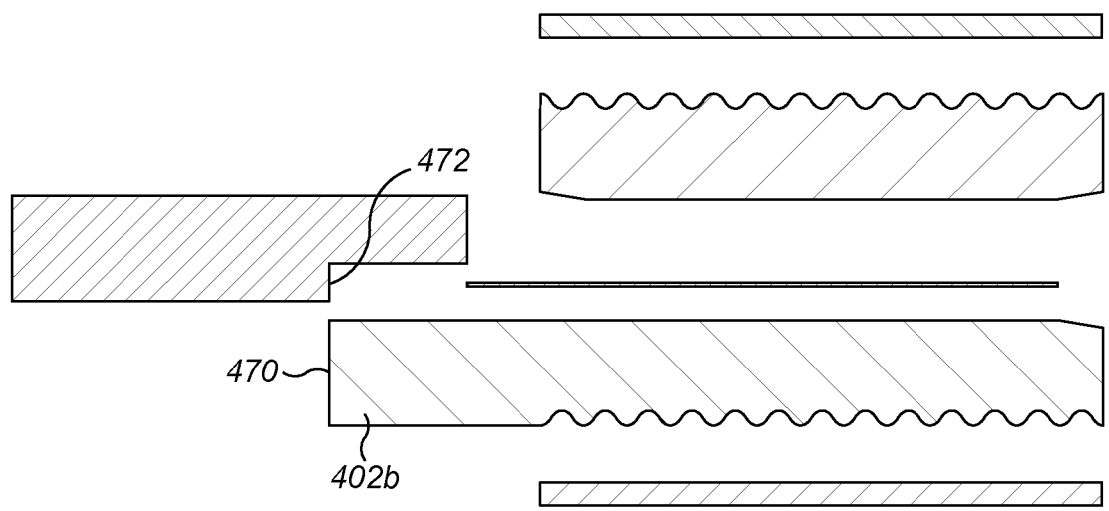
FIG. 4e shows the view of FIG. 4d with the layers separated for illustrative purposes.

FIG. 1a-e show a ring shaped steel core 2 of a "Kammprofile" gasket having upper and lower facings 12, 14. The steel core has a large central aperture 4 and upper and lower faces. Referring to FIGS. 1d and 1e It can be seen that the upper face 6a is formed with a series of concentric "Kammprofile" serrations 8 around the aperture 4 which terminate approximately midway between the aperture and the outer periphery of the ring and an outer non-serrated portion 9a, 9b which circumferentially surrounds the serrated portion. The lower face 6b, not visible in FIGS. 1a and b, is identical to the upper face 6a. Also shown in FIG. 1a-e are upper and lower facings 12, 14. These are identical rings of sealing material and are designed to engage over the concentric serrations formed in the upper face 6a and lower face 6b of the core 2, respectively.

The outer non-serrated portion is formed with four equally circumferentially spaced apertures 10a, 10b, 10c, 10d to accommodate fixing means (not shown). The fixing means may also be produced from a dielectrically stronger and/or electrically insulating material such as plastic bolts.

As can be seen more clearly in FIGS. 1d and e, the steel core 2 is divided into a first part 2a and a second part 2b, such as an upper and lower axially separated parts 2a and 2b. An insulating film 40 is located between the separated parts 2a, 2b. The film 40 matches the shape of the ring 2 and is circumferentially aligned therewith to provide a barrier between the separated upper and lower parts 2a and 2b when the gasket is assembled.

The material of the film layer may be of any material indicated herein. For example, it may be a polyimide.

On assembly of the gasket, the first and second facing layers 12, 14 come directly into contact with the Kammprofile serrations 8 and are bonded thereto by a spray adhesive. Similarly, the film layer 40 comes into direct contact with the interior facing surfaces 42, 44 of the upper and lower parts. In favoured embodiments of this invention which will be described further the mean thickness of the film layer is 25 μm, 50 μm, 75 μm, 125 μm and 200 μm; and the mean thickness of the facing layer Is 0.5 mm. In favoured embodiments of the invention which will be described further the materials employed for the film layer are polyetheretherketone and polyimide polymers. The materials employed for the facing layers are exfoliated graphite or exfoliated vermiculite.

Such facing materials are compressible, and on assembly and installation of the gasket are typically compressed by from 40% to 80% of the original thickness. Compression is accompanied by the filling of the troughs of the Kammprofile and by the spreading of the facing material across the faces of the gasket.

As was noted above exfoliated graphite and exfoliated vermiculite have many excellent properties for use in the facing of a gasket, notably excellent mechanical properties, high thermal resistance and very good chemical resistance. They do not have good dielectric properties. However, the polyetheretherketone and polyimide polymers of the film layer have excellent dielectric properties. Accordingly, an axially separated gasket as described herein can have all-round excellent properties.

It will be apparent from FIG. 1a to e that the outer non-serrated portions once mated together are not as thick as the inner serrated portion with the facing layers. In practice therefore, the mating surfaces of a flange pipe or other connecting conduits between which the gasket is located may not come into contact with the outer non-serrated portions but only the inner facing material.

Referring to FIGS. 2a-e, an alternative embodiment is shown. FIGS. 2a-e also show a ring shaped axially separated two part Kammprofile core 102. However, the upper part 102a and lower part 102b only match with respect to the serrated part 108a and 108b but have a different construction with respect to the non-serrated parts 109a and 109b. The upper non-serrated part 109a which circumferentially surrounds the serrated portion 108a is of a similar construction to that of FIG. 1 but is radially more limited in its extent. The lower part 102b has several further features. Firstly, the non-serrated part 109b extends radially beyond the circumferential limit of the upper part 109a and accommodates a further outer guide ring 130 in a circumferential radial recess 124 formed in its outer peripheral edge 126. The lower part 102b has an integral outer circumferential flange part 122 and the circumferential recess 124 is formed in the outer edge 126 of this flange 122. The outer ring 130 by means of being located exclusively in the lower part 102b may be made of electrically conductive or non-conductive material and is generally used to locate and manoeuvre the gasket in position so that it acts as a guide ring to aid installation, typically, in a bolt circle.

The outer circumferential flange 122 is integrally formed with the lower part 102b and describes a circular recess for the upper part 102a. When located centrally in the recess the radially inner edges of the upper part (102a) and its facing 112 are aligned with those of the lower part (102b) and its facing 114 whereas the outer edge 150 of the upper part and the inner edge 152 of the flange 122 are spaced from each other to define a circumferential axial channel 154. A ring shaped film 140 is located in the recess between the upper and lower parts (102a and 102b) and extends from the inner edge 152 of the flange 122 to the aperture 115.

The embodiment shown in FIGS. 2a to e also has some further advantageous features. Both the upper and lower parts have a bevelled edge (156, 158) on their facing surfaces at the aperture. The radially innermost edge of the film 140 terminates where it meets the beveled edges. In this manner, the film is less likely to be cut when the two parts are secured together. In addition, both the upper and lower parts (102a, 102b) have an L-section inner peripheral groove (160, 162) which face each other to form a circumferential radial recess 164 immediately surrounding the aperture 115 once the parts are secured together.

The upper part 102a also has a matching outer bevelled edge (166) on its inner surface at the outer periphery thereof to prevent the edge cutting into the film (140).

FIGS. 3a to e show a variation on the embodiment of FIGS. 2a to e. In this embodiment, the flange 222 is a separate metal ring rather than being integral with the lower part 202b. In other respects, the embodiment is as described for FIGS. 2a to e.

FIGS. 4a to e show a still further variation of the previous embodiments. The embodiment is similar to that described in FIGS. 2a to e and 3a to e but does not include a separate or integral flange with the lower part. Instead, the outer guide ring 430 has a smaller aperture than the radius of the lower part 402b and includes an axial cut out on its inner surface at its radially inner edge so that it can be located securely on the lower part 402b. The outer circumferential edge 470 of the lower part 402b abuts the cut out radially inner edge 472 on the lower surface of the outer ring 430 for close fitting abutting engagement therewith. Welding may be used to secure the parts together.

Figure 5:
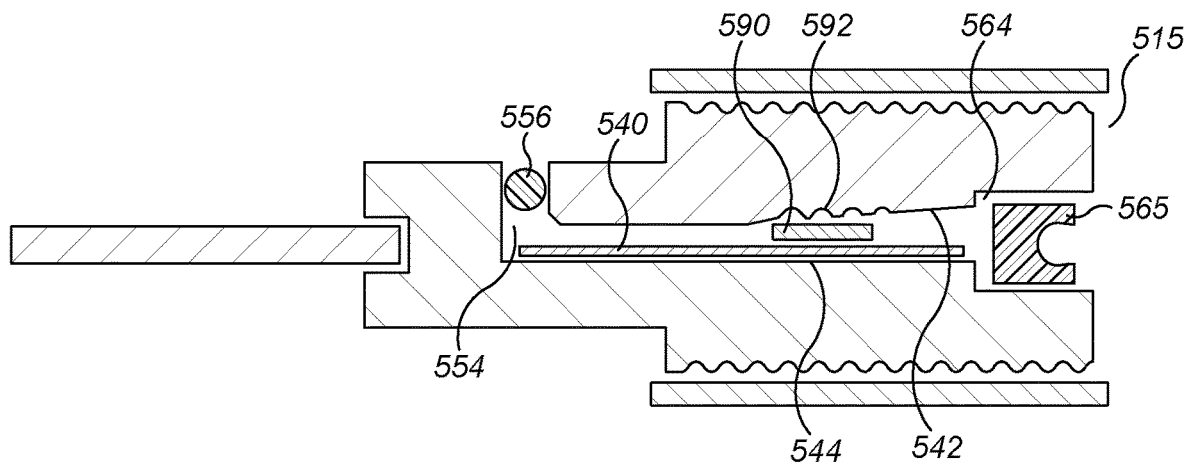
FIG. 5 shows a sectional view of a still further gasket according to the invention.

FIG. 5 shows a variation of the embodiment of FIG. 2. An O-ring seal 556 is located in axial circumferential recess 554 and a pressure energized lip seal 565 (including a spring, not shown) in the form of a C-ring is provided in the radial circumferential recess 564 surrounding the aperture 515. In FIG. 5, the inner facing surface 542 has been further modified to accommodate a further ring shaped inner layer 590 which is a graphite ring but could equally be a vermiculite composite. The graphite ring 590 is positioned over the inner layer 540 and in contact therewith. The radial extent of the further inner layer 590 is approximately $\frac{1}{5}^{th}$ that of the primary inner layer 540 and the inner aperture of the ring 590 is greater than the primary layer 540 whilst the diameter is smaller than the primary inner layer so that the further inner layer sits between the aperture edge and circumferential edge of the primary inner layer 540. As mentioned, the inner facing surface 542 is modified. There are two main modifications. A serrated surface 592 is formed on the facing surface 542 directly over and co-extensive with the further inner layer 590 so that this can come into contact with the further inner layer 590 during use. In addition, it can be seen that the inner surface 542 is only parallel with the lower surface 544 and inner layer 540 from the outer circumferential edge to the outermost inner facing serrations 592 and is then angled away from the inner layers (540.590) until it meets the radial circumferential recess 564 surrounding the aperture. This allows the further inner layer 590 to spread inwardly towards the aperture in use.

Figure 6:
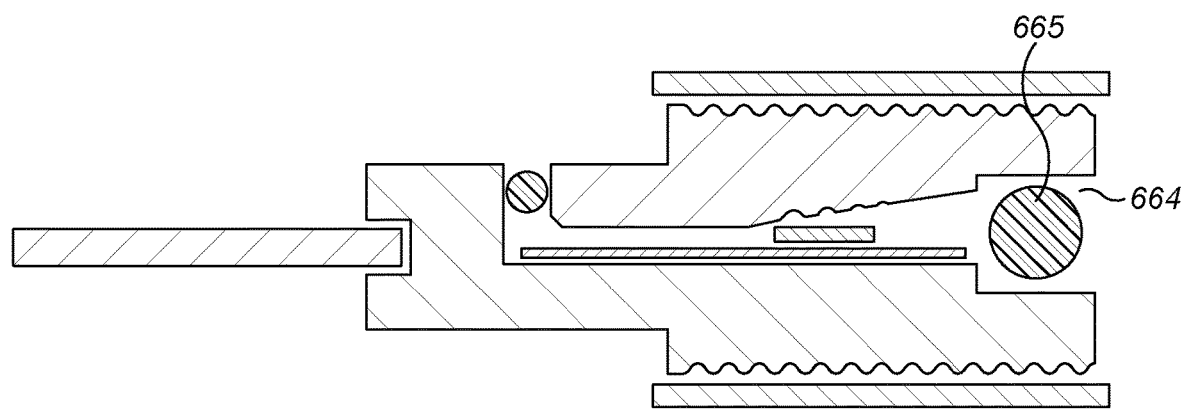
FIG. 6 shows a sectional view of a still further gasket according to the invention.

FIG. 6 shows a variation on FIG. 5 where the C-ring is replaced with an O-ring 665 located in the radial circumferential recess surrounding the aperture.

Figure 7A:
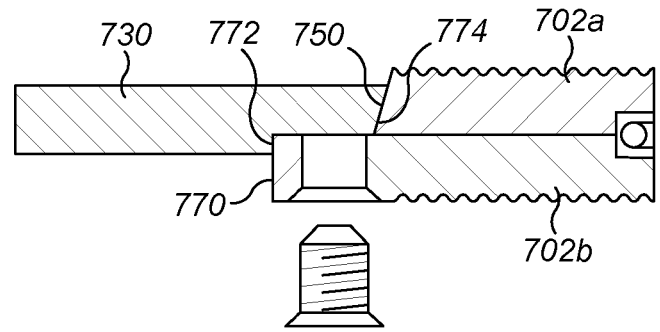
FIG. 7a shows a sectional views of a variation of the embodiment of FIG. 4.
Figure 7B:
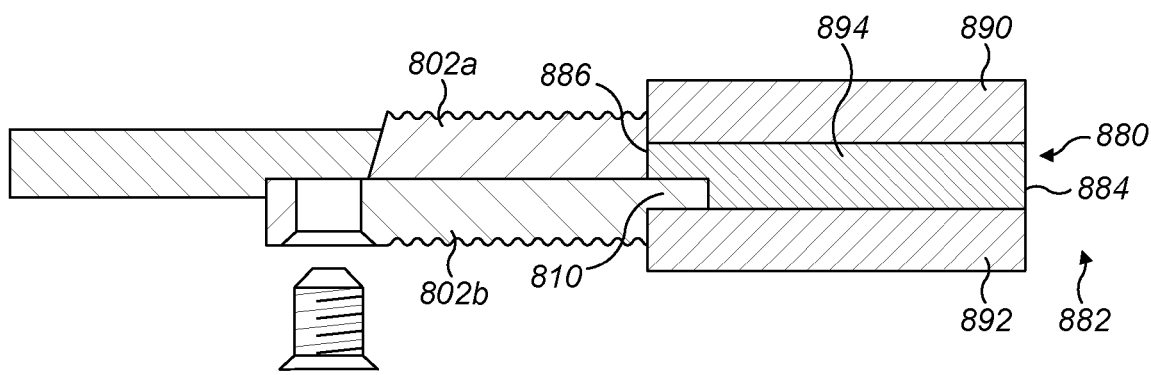

FIGS. 7a-b show sectional views of variations of the embodiment of FIG. 4. In FIG. 7a, the outer guide ring 730 is made of glass reinforced epoxy resin. Such a material is dielectrically strong and has low conductivity. Accordingly, both the outer circumferential face 770 of the lower Kammprofile part 702b and the outer circumferential face 750 of the upper Kammprofile part 702a abut the outer guide ring 730 along its radially inner edges, both the cut out radially inner edge 772 on the lower surface of the outer ring 730 and the radially innermost edge 774 on the upper part of the outer ring 730 for respective close fitting abutting engagement therewith. Adhesive may be used to secure the outer guide ring 730 to the Kammprofile parts 702a, 702b but in FIGS. 7a-b a mechanical fixing is used in the form of a threaded axial aperture in the radially overlapping section of the lower part 702b with a matching screw therethrough which secures the outer guide ring 730 into position. Still further a friction-fit or press-fit of the outer guide ring to the Kammprofile parts is also envisaged. In FIG. 7a, the outer circumferential face 750 of the upper Kammprofile part 702a extends at an acute angle so that the upper outer edge thereof is located within the radius of the lower outer edge thereof. In FIG. 7a, the outer guide ring 730 thickness is less than the combined thickness of the lower parts 702 a) and b) but variation in this is possible and the outer guide ring may have equivalent thickness as the thickness of the lower and upper parts combined.

In FIG. 7b, a modification of FIG. 7a includes a compression ring 880, the compression ring comprises deformable material defining a second aperture 882 therein. The compression ring has a radially inner edge 884 defining the second aperture and a radially outer peripheral region 886 designed to be secured to the core parts 802a, 802b along the radially inner peripheral edges thereof so that the compression ring is held securely by the core parts. The thickness of the compression ring is greater than the thickness of the core parts so that in use the compression ring deforms to a greater extent than the core parts. The compression ring is made of expanded PTFE. The compression ring 880 is also formed into two equivalent axially displaced parts 890, 892 to prevent charge leakage by locating a generally contiguous ring 894 made from dielectrically resistant material there between. The contiguous ring is made from glass reinforced epoxy resin to provide the dielectric resistance. The compression ring 880 is secured to the core parts 802a, 802b by adhesive and mutually overlapping flanges. The lower part 802b has a radially inwardly extending flange 810 so that the lower compression ring part 892 extends thereunder to abut the inner peripheral edge of the serrated profile of the core 802 at the outer peripheral edge thereof and the contiguous ring 894 has a complimentary radially outwardly extending flange 812 which extends over the core flange 810 before abutting the upper core part 802a.

Figure 8A:
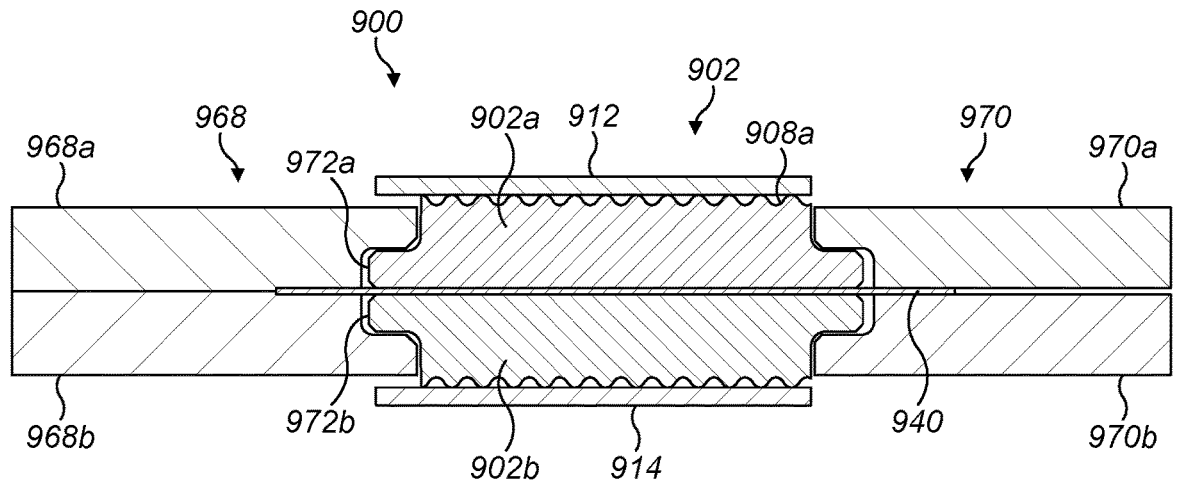
FIG. 8a shows a cross-section view of view of a gasket according to the present invention.
Figure 8B:
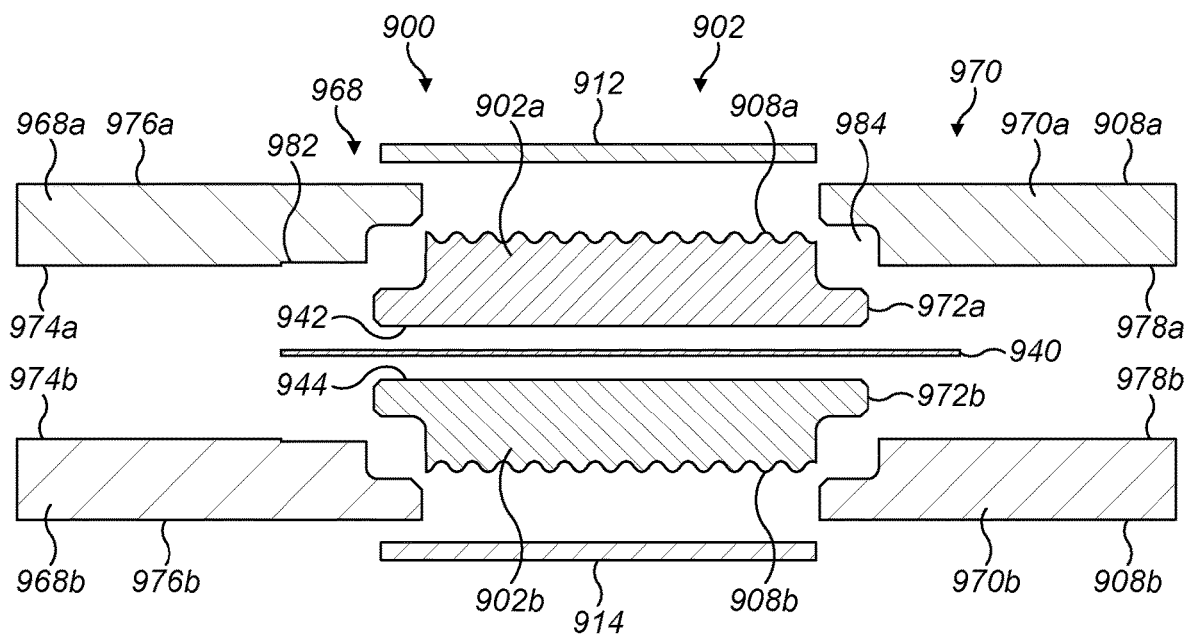

FIG. 8a shows a cross-section view of a gasket 900 according to the present invention and FIG. 8b shows an exploded view of the components of the example of the gasket 900 shown in FIG. 8a. In this example, the gasket 900 comprises a rigid core 902 comprising a first part 902a and a second part 902b. In some examples, the first part 902a and the second part 902b are upper and lower parts respectively, but in other examples, the first part 902a and the second part 902b may be side-by-side. The rigid core 902 may be ring shaped.

In this example, the first part 902a and the second part 902b each include an inner surface 942, 944 and an outer surface 908a, 908b. In other words, the first part 902a has an inner surface 942 and an outer surface 908a and the second part 902b has an inner surface 944 and an outer surface 908b.

At least one of the outer surface 908a of the first part 902a and the outer surface 908b of the second part 902b comprises a serrated profile.

The core 902a may be part of a "Kammprofile" gasket having upper and lower facings 912, 914 that are configured to engage with the serrated profile, in use. On assembly of the gasket 900, the first and second facing layers 912, 914 come directly into contact with the serrated profile of the outer surface 908 and may be bonded thereto by a spray adhesive. The mean thickness of the facing layer may be approximately 0.5 mm.

The gasket 900 also includes an insulating layer 940 between the inner surface 942 of the first part 902a and the inner surface 944 of the second part 902b to substantially reduce electrical conduction between the first part 902a and the second part 902. In other words, the insulating layer 940 provides electrical insulation between the first part 902a and the second part 902b to reduce the amount of electrical current or charge that passes between the first part 902a and the second part 902b. The insulating layer 940 may match the shape of the core 902 and aligned therewith to provide a barrier between the separated first part 902a and second part 902b when the gasket 900 is assembled.

The insulating layer 940 comes into direct contact with the inner surfaces 942, 944 of the first and second parts 902a, 902b. In some examples, the mean thickness of the insulating layer 940 layer is between approximately 50 μm to 300 μm. For example, the mean thickness of the film layer may be 50 μm, 75 μm, 125 μm, 200 μm or 300 μm. The provision of an insulating layer 940 with a thickness of between 50 μm to 300 μm results in reduced creep of the insulating layer 940 overtime. Creep can damage the effectiveness of the insulating layer 940 and so providing the insulating layer with a thickness of between 50 μm to 300 μm improves the sealing for the gasket 900.

In some examples, the insulating layer 940 may be a film or a sheet. The material of the insulating layer 940 may be of any material indicated herein. For example, it may made of polyetheretherketone and polyimide polymers. Further, the insulating layer 940 may have a dielectric strength as described above. The polyetheretherketone and polyimide polymers of the insulating layer 940 have excellent dielectric properties. Accordingly, an axially separated gasket 900 as described herein can have all-round excellent properties.

The inner surface 942 of first part 902a and the inner surface 944 of the second part 902b may each comprise an abutting region that abuts the insulating layer 940. In the examples shown in FIGS. 8a and 8b, all of the inner face 942 of the first part 902a is an abutting region because in this example, all of the inner face 942 of the first part 902a is configured to abut the insulating layer 940, in use. All of the inner face 944 of the second part 902b is also an abutting region for the same reason. In some examples, the profile or shape of the insulating layer 940 is configured to substantially match the profile or shape of the abutting regions of the inner surfaces 942, 944 of the first part 902a and second part 902b. Providing a matching profile for the abutting region of the inner surface and the insulating layer means that the insulating layer 940 is confined between the extent of the abutting regions of the inner surfaces 942, 944 of the first part 902a and the second part 902b. Therefore, there is not an excess of insulating layer 940 that extends beyond the core 902 of the gasket 900.

In the example shown in FIGS. 8a and 8b, the profile or shape of the insulating layer 940 extends beyond the abutting regions of the first and second parts 902a, 902b. This enables the insulating layer 940 to be held between additional components, in addition to the first part 902a and the second part 902b. For example, the insulating layer 940 may also be held between an exterior member 968 and an interior member 970, as described in more detail below.

As shown in FIGS. 8a and 8b, the gasket 900 may comprise an exterior member 968. The exterior member 968 is located outside of the core 902 and is configured to abut the core 902, in use.

The provision of an exterior member 968 that abuts the core means that there is a reduced stress on the core 902, in use, because the there is a larger surface area of abutting components across the gasket 900. The exterior member 968 may be made of an epoxy resin and therefore provide further electrical insulation in the gasket 900. The exterior member 968 is used to centre the gasket 900 and ensure that the core 902 is correctly positioned in the gasket 900.

The gasket 900 may also include an interior member 970 that is located within the core 902 and abuts the core 902.

The interior member 970 may define an aperture (which would be towards the right of FIG. 8a) and separate the core 902 from the aperture in use. As such, the interior member 970 may provide thermal insulation between the core 902 and any fluid passing through the gasket 900. In examples, the interior member 970 is made of a non-electrically conducting material, such as PTFE, Polytetrafluoroethylene. In some examples, the interior member 970 is made of glass filled epoxy. As discussed above, providing a non-conducting interior member 970 and a non-conducting exterior member 968 substantially reduces electrical arcing across the gasket 900.

In some examples, the interior member 970 fills any imperfections in the core 902 caused by corrosion, for example by sea water.

In the example where the core 902 is substantially ring shaped, the interior member 970 is an interior ring and the exterior member 968 is an exterior ring.

The core 902, the interior member 970 and the exterior member 968 may be complimentary shaped to couple the core 902 to both the exterior member 968 and the interior member 970.

The exterior member 968 may comprise a first exterior member 968a and a second exterior member 968b, the first exterior member 968a and the second exterior member 968b each comprising an inner surface 974a, 974b and an outer surface 976a, 976b. Splitting the exterior member 968 into a first exterior member 968a and a second exterior member 968b means that the insulating layer 940 may extend in such a way that it is coupled between the first exterior member 968a and the second exterior member 968b.

The interior member 970 may comprise a first interior member 970a and a second interior member 970b, the first interior member 970a and the second interior member 970b each comprising an inner surface 978a, 978b and an outer surface 980a, 980b. Splitting the interior member 970 into a first interior member 970a and a second interior member 970b means that the insulating layer 940 may extend in such a way that it is coupled between the first interior member 970a and the second interior member 970b.

Surprisingly, it has been found that splitting the interior member 970 into a first interior member 970a and a second interior member 970b and splitting the exterior member 968 into a first exterior member 968a and a second exterior member 968b, combined with the presence of the insulating layer 940, reduces possible leak paths through the gasket 900 because, as described above, the insulating layer 940 may extend in such a way so as to be held between the first interior member 970a and the second interior member 970b and also the first exterior member 968a and the second exterior member 968b. This arrangement of the insulating layer 940 also reduces the chances of electrical arcing across the gasket, because any possible air path through the gasket 900 is significantly lengthened. Splitting the interior member 970 and exterior member 968 also makes it easier to provide one or more lugs in the core 902.

Assembling the interior member 970, the core 902 and the exterior member 968 together can be difficult, especially in the embodiment in which the interior member 970 is an interior ring, the core 902 is substantially ring shaped and the exterior member 968 is an exterior ring. Splitting the exterior member 968 into a first exterior member 968a and a second exterior member 968b and splitting the interior member 970 into a first interior member 970a and a second interior member 970b reduces the difficulty of the assembly. For example, a part of the first exterior 968a member may overlap with a portion of the core 902 such that they are engaged together. Further, a portion of the first interior member 970a may overlap with a portion of the core 902 such that they are engaged together. Overlapping a portion of the first interior member 970a and/or first exterior member 968a with a portion of the core 902 will reduce leak rate through the gasket 900 because the length of the air path is increased.

At least part of the inner surface 978a of the first interior member 980a may be configured to abut at least part of the inner surface 978b of the second interior member 970b.

In one example, the exterior member 968 comprises a locating groove 982 for locating and receiving the insulating layer 940. In some examples, the locating groove is located on the inner surfaces of the first exterior member 968a and the second exterior member 968b, for example as an indent or recess. The interior member 970 may include may also include a locating groove. In some examples, the locating groove is located on the inner surfaces of the first interior member 970a and the second interior member 970b, for example as an indent or recess.

At least part of the inner surface 974a of the first exterior member 968a may be configured to abut at least part of the inner surface 974b of the second exterior member 968b.

The first exterior member 968a may be coupled to the second exterior member 968b by an adhesive. The first interior member 970a may be coupled to the second interior member 970b by an adhesive, such as Loctite A331. In some examples, an activator, such as Loctite 7387 is used in addition to the adhesive. Having a two-part adhesive system offers manufacturing advantages as the reaction doesn't start until the activator meets the adhesive.

In the example shown in FIGS. 8a and 8b, the first part 902a and the second part 902b of the core 902 comprises one or more lugs 972a, 972b or protrusions. The lugs 972a, 972b are effectively a thickening or widening of the core 902 towards the inner surfaces 942, 944 of the first part 902a and the second part 902b. In other words, the one or more lugs 972a, 972b may be located towards the inner surface 942, 944 of at least one of the first part 902a and the second part 902b such that the profile of the inner surface 942, 944 of at least one of the first part 902a and the second part 902b extends beyond the profile of the outer surface 908a, 908b of the at least one of the first part 902a and the second part 902b.

In use, the lugs 972a, 972b increases the abutting region of the first part 902a and the second part 902b, thereby spreading the load between the first part 902a and the second part 902b of the core 902 of the gasket 900. The provision of the lugs 972a, 972b reduces the stresses on the insulating layer 940.

At least one of the interior member 970 and the exterior member 968 may comprise one or more recesses 984 configured to receive the one or more lugs 972a, 972b. In other words, the shape of the interior member 970 and the exterior member 968 is configured to engage with the shape of the core 902 to form a seal.

Figure 9A:
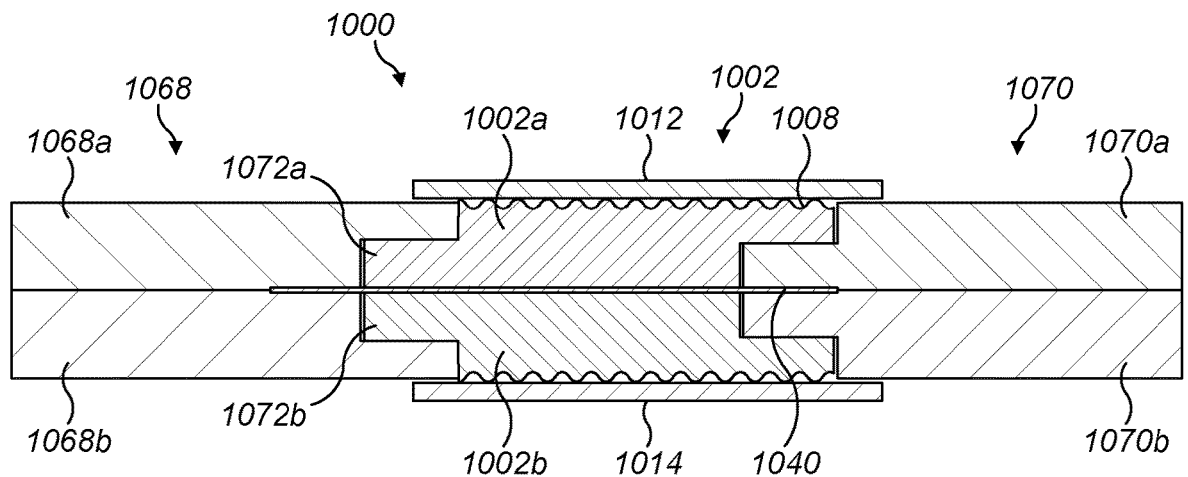
FIG. 9a shows a cross-section view of view of a gasket according to the present invention.
Figure 9B:
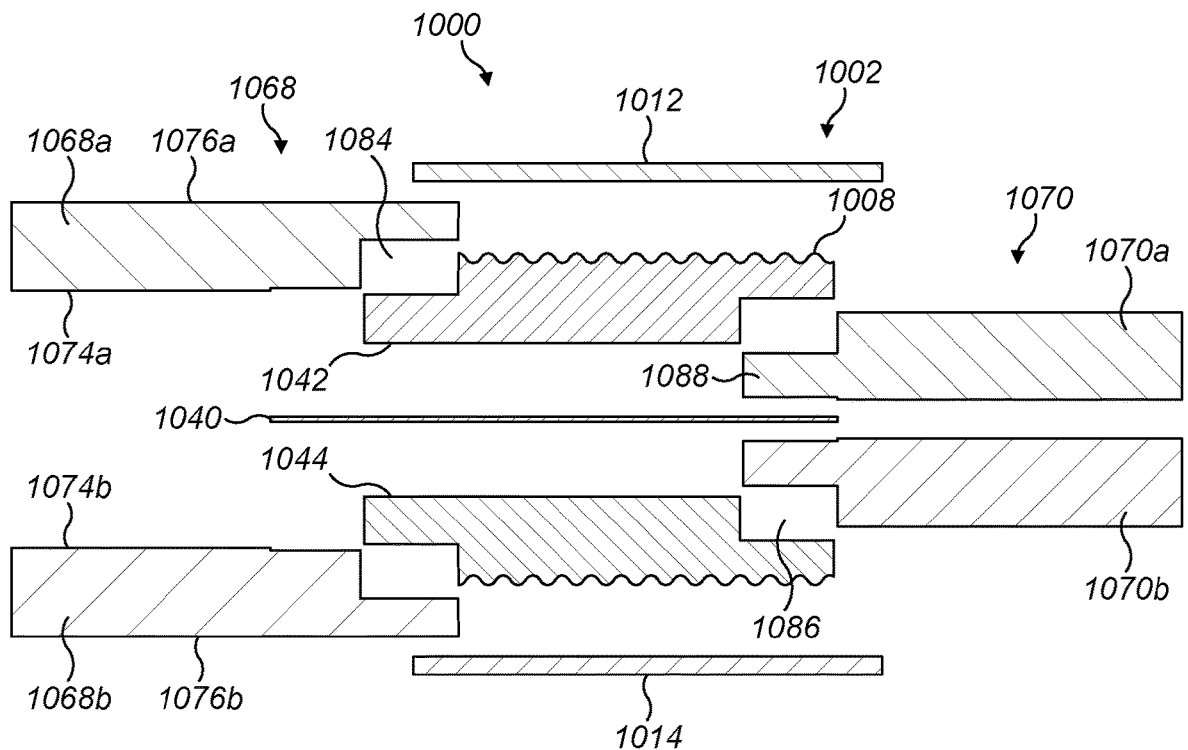

FIG. 9a shows a cross-section view of a gasket 1000 according to the present invention and FIG. 9b shows an exploded view of the components of the gasket 1000 shown in the example of FIG. 9a. The reference signs for FIG. 9 are identical to the reference signs shown in FIG. 8, with an increment of 100.

The example shown in FIGS. 9a and 9b is substantially identical to the examples shown in FIGS. 8a and 8b, except that one of the lugs 1072b of the first part 1002a and second part 1002b of the core 1002 has been replaced by a recess 1086. Further, recesses in the interior member 1070 have been replaced with protrusions 1088 to couple with the recesses 1086 in the core 1002 to form a seal.

In the example shown in FIGS. 9a and 9b, the interior member 1070 comprises protrusions 1088 configured to be received in recesses in the core 1002, but in other examples, the exterior member 1068 comprises protrusions 1088 configured to be received in recesses in the core 1002.

At least one of the interior member 1070 and the exterior member 1068 may comprise one or more protrusions 1088 configured to be received in the one or more recesses 1086 in the at least one of the first part 1002a and the second part 1002b of the core 1002.

Providing recesses 1086 and protrusions 1088 assists with the coupling of the core 1002 with the interior member 1070 and the exterior member 1068, reducing the chances of them from separating during assembly or use. Further, in some examples, the provision of one or more protrustions 1088 in the interior member 1070 that are configured to engage with one or more recesses 1086 in the core 1002 means that in some examples, the interior member 1070 can be formed of a single piece, but the benefits discussed above of improved resistance to electrical arcing and the ease of manufacturing are still felt.

Figure 10A:
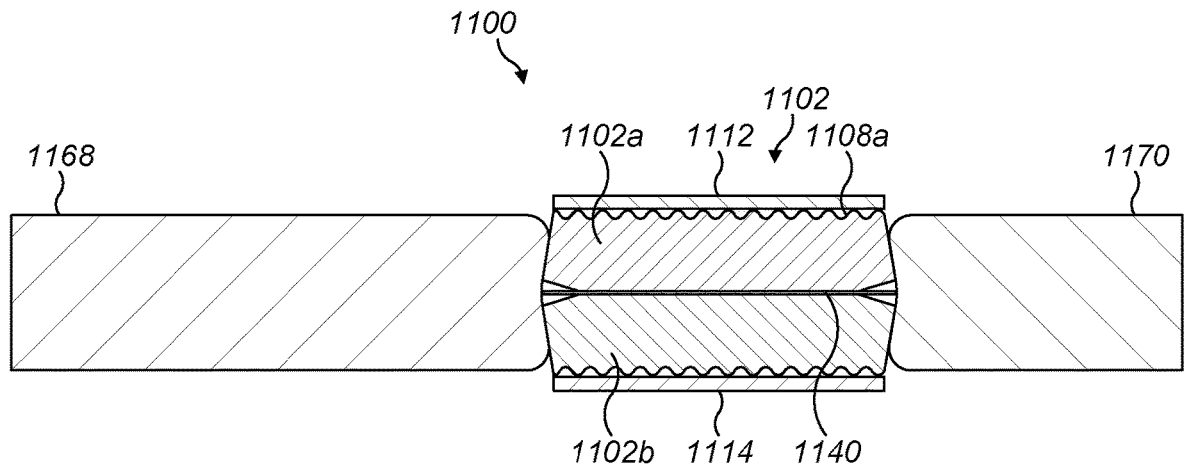
FIG. 10 shows a cross-section view of view of a gasket according to the present invention.
Figure 10B:
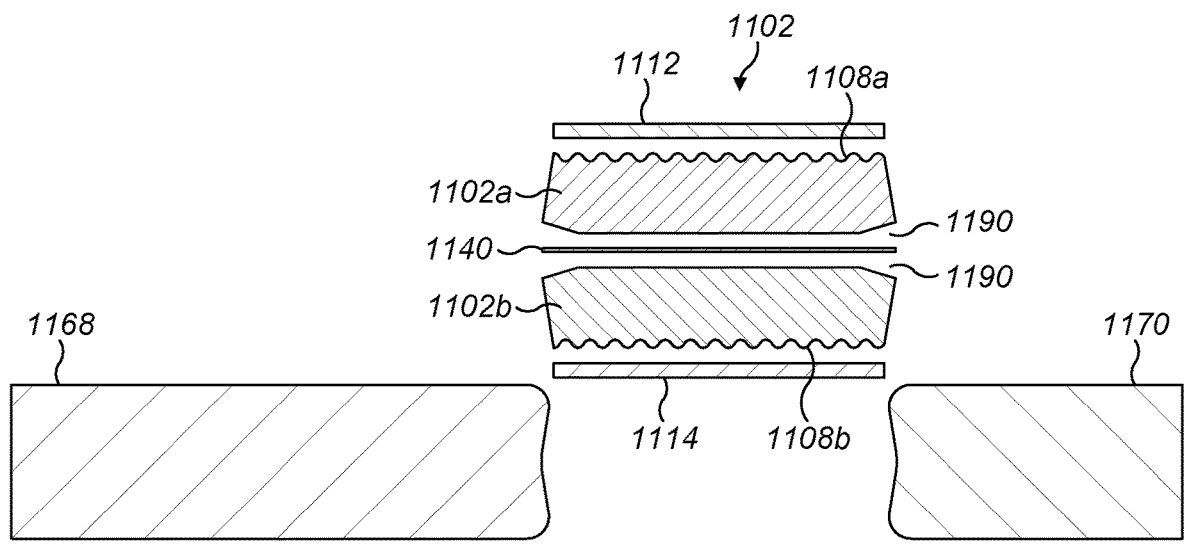

FIG. 10a shows a cross-section view of a gasket 1100 according to the present invention and FIG. 10b shows an exploded view of the components of the example of the gasket 1100 in FIG. 10a. The reference signs for FIG. 10 are identical to the reference signs shown in FIG. 9, with an increment of 100.

In this example, the interior member 1170 is formed of a single piece, but in practice, it may be split into a first interior member and a second interior member. Further, the exterior member 1168 is formed of a single piece, but in practice, it may be split into a first exterior member and a second exterior member.

The core 1102 may coupled to the interior member 1170 and the exterior member 1168 via a press fit. The press fit ensures that the core 1102 is held rigidly between the interior 1170 and the exterior members 1168. In this example, shape of the core 1102 and the shape of the interior members 1170 and the exterior members 1168 have complimentary shapes such that the core 1102 can be pressed into an opening between the interior member 1170 and the exterior members 1168 and then resiliently held in place. In one example, the core 1102 is shaped such that it has a waist of a relatively larger size compared with the outer surfaces 1108 of the core 1102. In other words, the core 1102 tapers towards a central region which has a relatively larger size compared with the outer regions. In this example, the interior member 1170 and exterior member 1168 have a complimentary taper, such that when the core is received in the exterior member 1168 and the interior member 1170, there is a seal formed across the gasket.

In one example, both the first and second parts 1102a, 1102b have a bevelled edges 1190. In one example, the insulating layer 1140 stops before the bevelled edges, such that the insulating layer 1140 is less likely to be cut when the first part 1102a and the second part 1102b are secured together.

Figure 11:
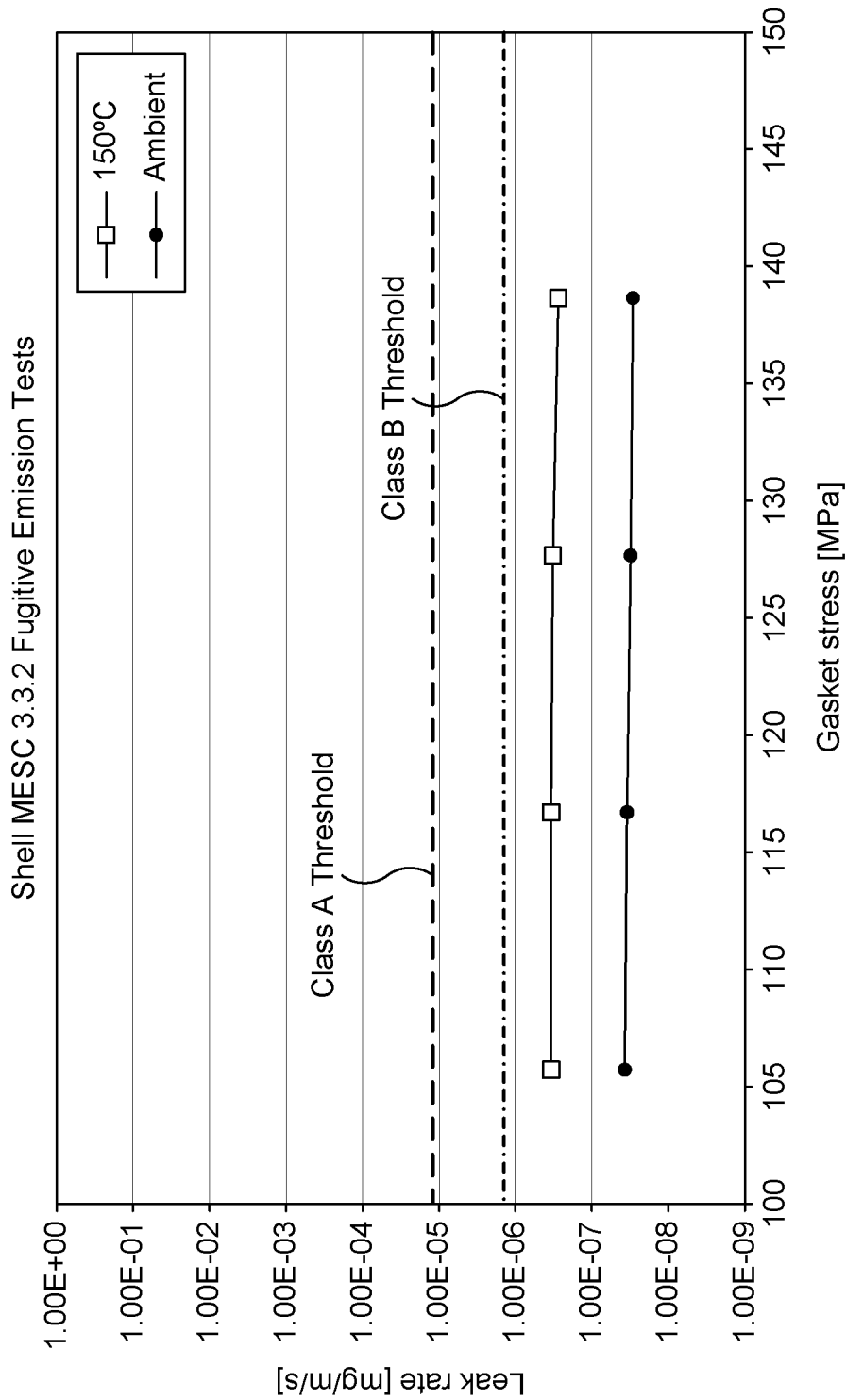
FIG. 11 shows the results of a Shell MESC 3.3.2 Fugitive Emission Test.

FIG. 11 shows the results of a Shell MESC 3.3.2 Fugitive Emission Tests on the gasket as shown in FIGS. 8a and 8b.

The gasket was tested at both ambient temperature and at 150° C. for leak rates (mg/m/s). The gasket was also tested at various stresses (MPa), as shown by the X-axis of the graph.

As shown in FIG. 11, the leak rate (mg/m/s) has little variation with gasket stress at 150° C., which indicates that the leak rate is largely independent of applied stress. In addition, the leak rate (mg/m/s) has little variation with gasket stress at ambient temperature, which indicates that the leak rate is largely independent of applied stress.

At both 150° C. and ambient temperature, the leak rate (mg/m/s) is below the Class A threshold and the class B threshold, which is the best class for gaskets.

An API 6FB (Third Edition November 1988) Non bending, On-Shore fire test was conducted at Yarmouth Research and Technology LLC, North Yarmouth, Me.

The results of the burn and cool down test are presented below:

| Burn and Cool Down Test | | |
| --- | --- | --- |
| Burn Start Time: | 13:27:00 | |
| Burn/Cooldown Duration: | 60 | minutes |
| Average Pressure During Burn/Cooldown: | 563 | psig |
| Leak Rate During Burn/Cool Down | 0.7 | ml/min |
| Allowable External Leak Rate: | 24.0 | ml/min |
| Amount of Time of Avg. Cal. Block > 1200 deg.: | 21.0 | minutes |
| Were Test Conditions Within Compliance? | Yes | |
| Was the Leakage Below the Allowable? | Yes | |
| Depressurization-Repressurization Test | | |
| Average Pressure During Test: | 555 | psig |
| Gasket Leak Rate: | 0.4 | ml/min |
| Allowable External Leak Rate: | 24.0 | ml/min |
| Was the Leakage Below the Allowable? | Yes | |
| Does the Gasket Pass or Fail API 6FB? | PASS | |

The gasket as shown in FIG. 8a passed a fire test conducted in accordance with APR standard 6FB, third edition.

Figure 12:
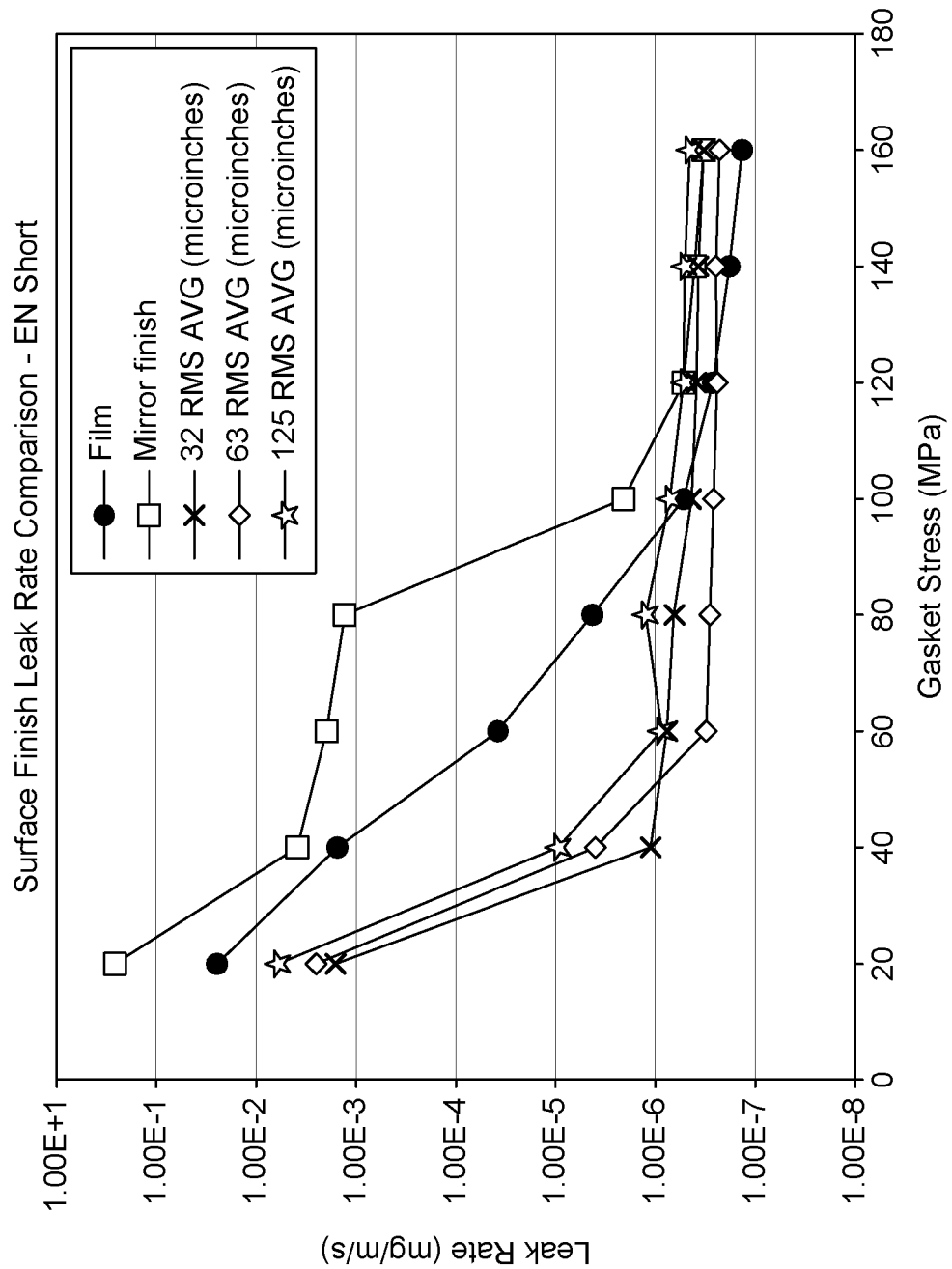
FIG. 12 shows the results of a leak rate comparison of different surface roughness RA values of inner surfaces.

FIG. 12 shows a graph showing the effect of surface roughness of the inner surfaces 942, 944 of each of the first part 902a and second part 902b on the leak rate.

As described above, the inner surface 942 of the first part 902a and inner surface 942 of the second part 902b are in contact with the insulating layer 940. The surface roughness of the inner surface 942, 944 of the first part 902a and second part 902b has an effect on the leak rate (mg/m/s) in the gasket 900. As described above, if the surface roughness Ra is too low, then there may be one or more air paths between the insulating layer 940 and the first part 902a and the second part 902b of the core 902.

In addition, if the surface roughness Ra is too high, then the inner surface 942 of the first part 902a and the inner surface 944 of the second part 902b may cut into the insulating layer 940 and thereby damage the insulating layer 940, making it less effective, in use, as the insulating properties of the insulating layer 940 are reduced or destroyed.

FIG. 12 shows the leak rate (mg/m/s) relative to gasket stress (MPa) for various surface roughnesses (Ra—microinches). As mentioned above, Ra may be determined by Ra may be determined by ASME B46.1.

As shown in FIG. 12, the mirror finish line is the smoothest finish and the leak rate is the highest at most of the stresses because there may be one or more air paths between the insulating layer 940 and the first part 902a and the second part 902b.

The film line represents a test in which the insulating layer 940 was tested itself between components with surface roughness. The fact that these results show improved sealing compared with the metallic parts with mirror finish confirmed the theory that components with a higher surface roughness contacting the insulating, as opposed to components with mirror finish, improved sealing ability.

When the inner surfaces have an Ra surface roughness of 32 microinches, the leak rate drops from approximately 1E-3 at 20 MPa to 1E-6 at 40 MPa and continues to drop as the gasket stress increases.

When the inner surfaces have an Ra surface roughness of 63 microinches, the leak rate drops from approximately 1E-3 at 20 MPa to 1E-5 at 40 MPa and continues to drop as the gasket stress increases. Between 60 MPa to 120 MPa, the leak rate is lowest when the inner surfaces have an Ra surface roughness of 63 microinches.

When the inner surfaces have an Ra surface roughness of 125 microinches, the leak rate drops from approximately 1E-3 at 20 MPa to 1E-6 at 60 MPa, but then has a slight increase to 80 MPa. The reason for this is that the inner surfaces 942, 944 of the first part 902a and the second part 902b will cut into the insulating layer 940.

It has been found that for improved sealing the Ra surface roughness of the inner surface of the core parts should be at least 16 microinches, more typically, at least 20 microinches, most typically, at least 24 microinches.

It has been found that for improved sealing the Ra surface roughness of the inner surface of the core parts should be less than 64 microinches, more typically, less than 48 microinches, most typically, less than 32 microinches.

Accordingly, the Ra surface roughness of the inner surface of the core parts may be in the range 16 to 64 microinches, more typically, 20 to 48 microinches, most typically, 24 to 32 microinches. In some examples, the Ra surface roughness of the inner surface of the core parts is between 16 to 32 microinches.

Providing an Ra surface roughness of more than these values means that there is a sufficient seal between the upper part, lower part and the insulating layer, this is a surprising development as the problems air paths forming between the insulating layer, the upper part and the lower part were not expected.

Providing an Ra surface roughness of less than these values means that the insulating layer will not be damaged, for example cut, due to the roughness of the inner surfaces of the upper and lower parts.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A gasket comprising a rigid core comprising a first part and a second part, the first part and the second part each comprising an inner surface and an outer surface, wherein at least one of the outer surface of the first part and the outer surface of the second part comprises a serrated profile; and an inner insulating layer between the inner surface of the first part and the inner surface of the second part to prevent the first and second parts contacting each other to substantially reduce electrical conduction between the first part and the second part, wherein the inner insulating layer has a mean thickness of 50 μm to 300 μm, wherein the insulating layer is an electrically non-conductive film comprising a substantially incompressible polymeric material comprising
   polyaryletherketone (PAEK),
   polyimide (PI),
   fluorinated ethylene propylene copolymer (FEP),
   polyetherimide (PEI),
   polyethersulfone (PES),
   polytetrafluoroethylene (PTFE),
   ethylene-chlorotrifluoroethylene copolymer (E-CTFE),
   ethylene-tetrafluoroethylene copolymer (ETFE),
   polycarbonate (PC),
   polychlorotrifluoroethylene (PCTFE),
   polyvinylidenefluoride (PVDF),
   polyimide (thermosetting),
   bis-maleimide (BMI), or
   phthalonitrile resin,
wherein the rigid core defines an aperture, and wherein (i) the gasket comprises an exterior member located radially outside of the core, wherein the exterior member abuts the core, or (ii) the gasket comprises an interior member located within the aperture, wherein the interior member abuts the core.

2. The gasket of claim 1, further comprising a sealing facing layer on the at least one outer surface comprising the serrated profile.

3. The gasket of claim 2, wherein the inner insulating layer introduces or increases a mechanical, chemical or electrical property which is absent or inadequate in the sealing facing layer.

4. The gasket of claim 2, wherein the sealing facing layer comprises a compressible material.

5. The gasket of claim 2, wherein the thickness of the sealing facing layer when uncompressed exceeds the thickness of the inner insulating layer by a ratio of at least 2; and the ratio of the thickness of the sealing facing layer, when compressed in use to the thickness of the inner insulating layer is at least 1.5.

6. The gasket of claim 2, wherein the sealing facing layer is formed of or comprises polytetrafluoroethylene, layered silicates, a ceramic, graphite or vermiculite.

7. The gasket of claim 1, wherein the inner insulating layer has a dielectric strength in kV/mm at 20° C. and 55% humidity of at least 10 kV/mm.

8. The gasket of claim 1, wherein the inner surface of at least one of the first part and the second part is chamfered at an edge that contacts the inner insulating layer and that is proximate to the aperture defined by the rigid core.

9. The gasket of claim 1, wherein the inner surface of at least one of the first part or the second part is chamfered at an edge that is radially outermost and that contacts the inner insulating layer.

10. The gasket of claim 1, wherein the inner surface of at least one of the first part or the second part has an Ra surface roughness of less than 64 microinches.

11. The gasket of claim 1, wherein the substantially incompressible polymeric material comprises a polyimide, polyetherimide, polyethersulfone, polytetrafluoroethylene, polytetrafluoroethylene filled with glass, or a polyaryletherketone.

12. The gasket of claim 1, comprising one or more further inner layers between the first and second parts.

13. The gasket of claim 1, wherein the gasket includes the interior member, and wherein the interior member comprises a compression ring located in the aperture defined by the core, wherein the compression ring defines a second aperture therein, the compression ring having an inner edge defining the second aperture and an outer region designed to be secured to the core first and second parts so that the compression ring is held securely by the core first and second parts.

14. The gasket of claim 1, wherein the inner surface of the first part and the inner surface of the second part each comprise an abutting region that abuts the inner insulating layer, wherein the profile of the inner insulating layer substantially matches or extends beyond the profiles of the abutting regions of the inner surfaces of the first part and the second part.

15. A method of producing a gasket comprising:
   i. providing a core having upper and lower mating parts, wherein each of the mating parts comprises an aperture, an outer surface, and an inner surface, and wherein at least one of the mating parts comprises a set of concentric serrations around the aperture on the outer surface of the said part;
   ii. optionally locating a sealing facing layer on the outer surface of at least one of the upper and lower mating parts;
   iii. locating an inner insulating layer between the mating parts; and
   iv. securing the inner insulating layer between the mating parts so that the inner surfaces thereof are in facing arrangement and the inner insulating layer is between the inner surfaces of the mating parts to prevent one mating part from directly contacting the other mating part, wherein the insulating layer has a mean thickness of 50 µm to 300 µm, wherein the insulating layer is an electrically non-conductive film comprising a substantially incompressible polymeric material comprising
polyaryletherketone (PAEK),
polyimide (PI),
fluorinated ethylene propylene copolymer (FEP),
polyetherimide (PEI),
polyethersulfone (PES),
polytetrafluoroethylene (PTFE),
ethylene-chlorotrifluoroethylene copolymer (E-CTFE),
ethylene-tetrafluoroethylene copolymer (ETFE),
polycarbonate (PC),
polychlorotrifluoroethylene (PCTFE),
polyvinylidenefluoride (PVDF),
polyimide (thermosetting),
bis-maleimide (BMI), or
phthalonitrile resin,
the method further comprising (i) locating an exterior member radially outside of the core wherein the exterior member abuts the core, or (ii) locating an interior member within the aperture wherein the interior member abuts the core.

* * * * *